United States Patent
Zhao et al.

(10) Patent No.: US 12,266,092 B2
(45) Date of Patent: Apr. 1, 2025

(54) MARKING METHOD AND APPARATUS OF CONTINUOUS COMPOSITE STRIP AND COMPUTER DEVICE

(71) Applicant: CONTEMPORARY AMPEREX TECHNOLOGY (HONG KONG) LIMITED, Hong Kong (CN)

(72) Inventors: Baiquan Zhao, Ningde (CN); Xianfeng Xie, Ningde (CN); Hongyuan Li, Ningde (CN); Jun Hu, Ningde (CN); Shiping Feng, Ningde (CN); Qian Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/669,567

(22) Filed: May 21, 2024

(65) Prior Publication Data
US 2024/0311993 A1 Sep. 19, 2024

Related U.S. Application Data

(63) Continuation of application No. PCT/CN2022/085713, filed on Apr. 8, 2022.

(51) Int. Cl.
*G06V 10/44* (2022.01)
*G06T 7/00* (2017.01)
*G06V 10/22* (2022.01)

(52) U.S. Cl.
CPC .......... *G06T 7/0004* (2013.01); *G06V 10/225* (2022.01); *G06V 10/44* (2022.01); *G06T 2207/30204* (2013.01)

(58) Field of Classification Search
CPC ........ G06T 7/0004; G06T 2207/30204; G06V 10/225; G06V 10/44; H01M 10/058;
(Continued)

(56) References Cited

FOREIGN PATENT DOCUMENTS

| CN | 104655644 A | 5/2015 |
|---|---|---|
| CN | 105290621 A | 2/2016 |

(Continued)

OTHER PUBLICATIONS

International Search Report received in the corresponding International Application PCT/CN2022/085713, mailed Dec. 27, 2022.
(Continued)

*Primary Examiner* — Sheela C Chawan
(74) *Attorney, Agent, or Firm* — Kilpatrick Townsend & Stockton LLP

(57) ABSTRACT

The disclosure discloses a marking method and apparatus of a continuous composite strip. The method incudes: collecting a first sequence of images of the continuous composite strip; splicing multiple images of the first sequence of images according to a collection sequence, to obtain a to-be-detected image with at least one electrode sheet structure; and marking, in case where two electrode sheet edges are identified in the to-be-detected image, a position of the collection-sequentially second electrode sheet edge in the continuous composite strip as an electrode sheet division position of the continuous composite strip. The method determines the electrode sheet division position by identifying the electrode sheet edges in the continuous composite strip, obtains the specific position information of the electrode sheet, and accurately performs the sheet division marking of the continuous composite strip.

20 Claims, 11 Drawing Sheets

(58) Field of Classification Search
CPC ...... H01M 50/595; G06F 17/40; G06F 16/90; B65H 2301/5111; B65H 2553/42; B65H 2701/19; Y02E 60/10; Y02P 70/50
See application file for complete search history.

(56) References Cited

FOREIGN PATENT DOCUMENTS

| | | |
|---|---|---|
| CN | 208654043 U | 3/2019 |
| CN | 109926733 A | 6/2019 |
| CN | 110480724 A | 11/2019 |
| CN | 212625734 U | 2/2021 |
| CN | 215280451 U | 12/2021 |
| CN | 113928908 A | 1/2022 |
| CN | 114122528 A | 3/2022 |
| DE | 102017223834 A1 | 7/2018 |
| DE | 102017223835 A1 | 7/2018 |
| JP | 2006179424 A | 7/2006 |
| JP | 2018113198 A | 7/2018 |
| KR | 20130064853 A | 6/2013 |
| WO | 2019076592 A1 | 4/2019 |

OTHER PUBLICATIONS

Written Opinion of ISA received in the corresponding International Application PCT/CN2022/085713, mailed Dec. 27, 2022.
The extended European search report received in the counterpart European Application 22936159.7, mailed on Oct. 24, 2024.
Written Decision on Registration received in the counterpart Korean Application 10-2024-7007208, mailed on Nov. 2, 2024.
The Notice of Reasons for Refusal received in the counterpart Japanese Application 2024-514411, mailed on Feb. 4, 2025.

SCHEMATIC DIAGRAM SHOWING AN IMAGE OF NON-BEGINNING-AND-NON-END

IMAGE OF ELECTRODE SHEET UNIT

SCHEMATIC DIAGRAM SHOWING AN IMAGE OF A FIRST SIDE WITH AN END SHEET

IMAGE OF ELECTRODE SHEET UNIT

MARKING METHOD AND APPARATUS OF CONTINUOUS COMPOSITE STRIP AND COMPUTER DEVICE

CROSS REFERENCE TO RELATED APPLICATION

This application is a continuation of International Application No. PCT/CN2022/085713, filed on Apr. 8, 2022, which is hereby incorporated by reference in its entirety.

TECHNICAL FIELD

The present disclosure relates to the technology field of lithium battery, and more particularly, relates to a marking method and apparatus of continuous composite strip, computer device, storage media, and computer program product.

BACKGROUND

With the development of new energy technology and environmental protection requirements, lithium batteries are widely used. For example, lithium batteries are used in new energy vehicles, mobile phones, laptop computers and so on. Therefore, the quality of the batteries is crucial, and how to efficiently and accurately check the quality of the batteries in the production process has become an urgent problem for battery manufacturers to solve.

In the quality assessment of a battery, it is the quality of the basic electrode sheets that is tested in the production process. As concerns the stacking process, the quality of the electrode sheets is affected by the division accuracy of the electrode sheets to a certain extent. Traditional division methods are applicable to the winding process, and the prior art methods may not be used for sheet division marking of a continuous composite strip.

SUMMARY

In view of the above, it is necessary to provide a marking method and apparatus of a continuous composite strip, a computer device, a computer-readable storage media, and a computer program product, which may realize the sheet division marking of the continuous composite strip for the above technical problems.

In a first aspect, the disclosure provides a marking method of a continuous composite strip. The method includes:
  collecting a first sequence of images of the continuous composite strip;
  splicing multiple images of the first sequence of images according to a collection sequence, to obtain a to-be-detected image with at least one electrode sheet structure; and
  marking, in case where two electrode sheet edges are identified in the to-be-detected image, a position of the collection-sequentially second electrode sheet edge in the continuous composite strip as an electrode sheet division position of the continuous composite strip.

In the above embodiments, the first sequence of images is obtained by collecting the images of the continuous composite strip; the to-be-detected image with at least one electrode sheet structure is obtained by splicing multiple images of the first sequence of images according to the collection sequence; in case where two electrode sheet edges are identified in the to-be-detected image, the position of the collection-sequentially second electrode sheet edge in the continuous composite strip is marked as the electrode sheet division position of the continuous composite strip. By using the image identification technology and according to the distribution characteristics of the electrode sheets in the continuous composite strip, the electrode sheet edges in the continuous composite strip is identified and the electrode sheet division position is determined, the specific position information of the electrode sheet is obtained, and the sheet division marking of the continuous composite strip is accurately performed.

In one of the embodiment, the method of the continuous composite strip further includes:
  Splicing, in case where only one electrode sheet edge is identified in the to-be-detected image, the to-be-detected image with a next frame of image adjacent to the to-be-detected image in the first sequence of images, and updating the to-be-detected image.

In the above embodiment, in case where only one electrode sheet edge is identified in the to-be-detected image, a new to-be-detected image is obtained by splicing the to-be-detected image with a next frame of image adjacent to the to-be-detected image. By re-performing the electrode sheet edge identification of the obtained new to-be-detected image, the accuracy of the sheet division marking of the continuous composite strip is increased.

In one of the embodiments, the method of the continuous composite strip further includes: taking an image at the second electrode sheet edge as a first frame of image for splicing a next to-be-detected image, and returning to the step of splicing multiple images of the first sequence of images according to the collection sequence to obtain the to-be-detected image with at least one electrode sheet structure.

In the above embodiments, in case where a previous electrode sheet division position of the continuous composite strip is determined, the image at the second electrode sheet edge corresponding to the previous electrode sheet division position is used as the first frame of image for splicing the next to-be-detected image. Return to the step of splicing multiple images in the sequence of images according to the collection sequence to obtain the to-be-detected image with at least one electrode sheet structure, and sequentially obtain all electrode sheet division positions in the continuous composite strip, so as to complete the sheet division marking of the continuous composite strip, and ensure the completeness of the marking information of the continuous composite strip.

In one of the embodiments, the first sequence of images is collected for a first side of the continuous composite strip, and the method further includes:
  collecting a second sequence of images of the continuous composite strip during transportation to a stacking process; the second sequence of images is collected for a second side of the continuous composite strip, and the first side and the second side are opposite sides of the continuous composite strip;
  splicing, for the second sequence of images, multiple images of the second sequence of images according to the collection sequence, to obtain a to-be-detected image with at least one electrode sheet structure; marking, in case where two electrode sheet edges are identified in the to-be-detected image, a position of the collection-sequentially second electrode sheet edge in the continuous composite strip as an electrode sheet division position of the continuous composite strip to obtain the electrode sheet division position on the second side of the continuous composite strip; and determining, in case where the electrode sheet division position on the first side of the continuous composite strip is same as the electrode sheet division position on the second side, the electrode sheet division position of the continuous composite strip.

In the above embodiment, sequences of images are obtained by collecting the images of two opposite sides of the continuous composite strip, and the to-be-detected images with at least one electrode sheet structure are obtained by respectively splicing multiple images of the sequences of images according to the collection sequence; in case where two electrode sheet edges are identified in the to-be-detected images, the positions of the collection-sequentially second electrode sheet edges in the continuous composite strip is marked as the electrode sheet division positions of the continuous composite strip; and the electrode sheet division positions on the first and second sides of the continuous composite strip are obtained. By determining whether the electrode sheet division position on the first side is same as the electrode sheet division position on the second side, the final electrode sheet division position of the continuous composite strip is determined, and on the basis of the determination of the specific position information of the electrode sheet, the accuracy of the sheet division marking of the continuous composite strip is further improved.

In one of the embodiments, the method of the continuous composite strip further includes:
   outputting the to-be-detected image and performing an abnormality detection of the continuous composite strip in case where no electrode sheet edge is identified in the to-be-detected image.

In the above embodiment, during the sheet division marking of the continuous composite strip, in case where no electrode sheet edge is identified in the to-be-detected image by the image identification, the to-be-detected image is output. The abnormality position on the continuous composite strip is determined according to the output to-be-detected image and the previously determined electrode sheet division position. It is possible to accurately determine the abnormality portion of the continuous composite strip and carry out the abnormality detection according to the determined abnormality position, so as to ensure the quality of the electrode sheet division of the continuous composite strip.

In one of the embodiments, the method of the continuous composite strip further includes:
   determining an edge spacing between the collection-sequentially first electrode sheet edge and second electrode sheet edge according to the electrode sheet division position;
   extracting an image between the first electrode sheet edge and the second electrode sheet edge and outputting the image of electrode sheet unit in case where the edge spacing meets a spacing requirement of electrode sheet division of the continuous composite strip.

In the above embodiment, on the basis of the determined electrode sheet division position of the continuous composite strip, the edge spacing between the collection-sequentially first electrode sheet edge and second electrode sheet edge is determined according to the electrode sheet division position. The image of electrode sheet unit of the electrode sheet unit on the continuous composite strip is obtained by detecting whether the edge spacing meets the spacing requirement of the electrode sheet division of the continuous composite strip and outputting the image of electrode sheet unit between the collection-sequentially first electrode sheet edge and second electrode sheet edge. The image of electrode sheet unit may be used in the strip detection of the continuous composite strip and for positioning the specific detection position of the continuous composite strip.

In one of the embodiments, determining the edge spacing between the first electrode sheet edge and the second electrode sheet edge includes:
   obtaining respectively position coordinates of the first electrode sheet edge and the second electrode sheet edge in the to-be-detected image; and
   determining the edge spacing between the first electrode sheet edge and the second electrode sheet edge according to the position coordinates.

In the above embodiment, by obtaining respectively the position coordinates of the first electrode sheet edge and the second electrode sheet edge in the to-be-detected image, the edge spacing between the first electrode sheet edge and the second electrode sheet edge is calculated on the basis of the position coordinates in same image coordinates, which improves the accuracy and reliability of the edge spacing.

In one of the embodiments, after extracting the image between the first electrode sheet edge and the second electrode sheet edge and outputting the image of electrode sheet unit in case where the edge spacing meets the spacing requirement of the electrode sheet division of the continuous composite strip, the method further includes:
   extracting image features of the image of electrode sheet unit;
   detecting whether the image of electrode sheet unit meets cell division conditions according to the image features;
   determining, in case where the cell division conditions are met, whether a summed length of multiple successive electrode sheet units in the continuous composite strip meets a requirement on length of a cell; wherein, one cell comprises a preset number of electrode sheet units; and
   marking a cell division position in case where the requirement on the length of the cell is met.

In the above embodiment, in case where the electrode sheet division position is marked and the edge spacing between the collection-sequentially first electrode sheet edge and second electrode sheet edge is determined to meet the spacing requirement of the electrode sheet division of the continuous composite strip, the image of electrode sheet unit is output. The image identification of the image of electrode sheet unit is performed to determine whether the cell division conditions are met and whether the summed length of multiple successive electrode sheet units in the continuous composite strip meets a requirement on the length of the cell, and determine the cell division position in case where both the cell division conditions and the requirement on length of the cell are met. By performing the electrode sheet division and the cell division of the continuous composite strip, the cell to which each electrode sheet unit belongs can be determined. Further, it is possible to bind the data of the continuous composite strip in each process with the corresponding electrode sheet unit and the cell corresponding to the electrode sheet unit, which may realize the data tracing of the continuous composite strip.

In one of the embodiments, detecting whether the image of electrode sheet unit meets the cell division conditions according to the image features includes:
   detecting whether a difference of numbers of anode tabs and cathode tabs of the image features meets a requirement on difference of numbers of cell division conditions, detecting, in case where the requirement on the difference of the numbers of the cell division conditions is met, whether an end mark of the cell of the image features meets a requirement on end mark of the cell division conditions, and determining, in case where the requirement on the end mark of the cell division conditions is met, that the cell division conditions are met.

In the above embodiment, by detecting whether the difference between the numbers of the anode tabs and the cathode tabs of the image features of the image of electrode sheet unit meets the requirement on the difference of the numbers of the cell division conditions, and whether the end mark of the cell meets the requirement on end mark of the cell division conditions, it is preliminarily determined whether the cell division conditions are met.

In one of the embodiments, marking the cell division position includes:

marking a position of the end mark of the cell of the image features in the continuous composite strip as the cell division position.

In the above embodiment, by marking the position of the end mark of the cell of the image features in the continuous composite strip as the cell division position, the integrality of the cell is ensured.

In one of the embodiments, prior to marking the cell division position, the method further includes:

obtaining number of pulses for image collection of the continuous composite strip during transportation to stacking process; and detecting whether the number of the pulses for image collection meets a requirement on pulses of cell division.

In the above embodiment, in case where the difference between the numbers of the anode tabs and the cathode tabs of the image features of the image of electrode sheet unit meets the requirement on the difference of the numbers of the cell division conditions, and the end mark of the cell is determined to meet the requirement on end mark of the cell division conditions, error correction of the cell division position is performed by obtaining the number of the pulses for image collection of the continuous composite strip during the transportation to the stacking process, which improves the accuracy of marking the cell division position.

In a second aspect, the disclosure further provides a marking apparatus of a continuous composite strip. The apparatus includes:

an image collection module, used for collecting a first sequence of images of the continuous composite strip during transportation to a stacking process;

a to-be-detected image determination module, used for splicing multiple images of the first sequence of images according to a collection sequence, to obtain a to-be-detected image with at least one electrode sheet structure; and an electrode sheet division module, used for marking, in case where two electrode sheet edges are identified in the to-be-detected image, a position of the collection-sequentially second electrode sheet edge in the continuous composite strip as an electrode sheet division position of the continuous composite strip.

In a third aspect, the disclosure further provides a computer device. The computer device includes a memory storing a computer program and a processor which implements the following steps when executing the computer program:

collecting a first sequence of images of the continuous composite strip;

splicing multiple images of the first sequence of images according to a collection sequence, to obtain a to-be-detected image with at least one electrode sheet structure; and marking, in case where two electrode sheet edges are identified in the to-be-detected image, a position of the collection-sequentially second electrode sheet edge in the continuous composite strip as an electrode sheet division position of the continuous composite strip.

In a fourth aspect, the disclosure further provides a marking system of a continuous composite strip. The marking system includes an image collection component, an encoder, a memory and the above-mentioned computer device, the image collection component supports the continuous composite strip, and the continuous composite strip drives the encoder to operate during travel of the strip to trigger the image collection component to collect images. The computer device includes a memory storing a computer program and a processor which implements the following steps when executing the computer program:

collecting a first sequence of images of the continuous composite strip;

splicing multiple images of the first sequence of images according to a collection sequence, to obtain a to-be-detected image with at least one electrode sheet structure; and marking, in case where two electrode sheet edges are identified in the to-be-detected image, a position of the collection-sequentially second electrode sheet edge in the continuous composite strip as an electrode sheet division position of the continuous composite strip.

In a fifth aspect, the disclosure further provides a computer-readable storage medium. The computer-readable storage medium has a computer program stored thereon, and the computer program implements the following steps when executed by a processor:

collecting a first sequence of images of the continuous composite strip;

splicing multiple images of the first sequence of images according to a collection sequence, to obtain a to-be-detected image with at least one electrode sheet structure; and marking, in case where two electrode sheet edges are identified in the to-be-detected image, a position of the collection-sequentially second electrode sheet edge in the continuous composite strip as an electrode sheet division position of the continuous composite strip.

In a sixth aspect, the disclosure further provides a computer program product. The computer program product includes a computer program, which implements the following steps when executed by a processor:

collecting a first sequence of images of the continuous composite strip;

splicing multiple images of the first sequence of images according to a collection sequence, to obtain a to-be-detected image with at least one electrode sheet structure; and marking, in case where two electrode sheet edges are identified in the to-be-detected image, a position of the collection-sequentially second electrode sheet edge in the continuous composite strip as an electrode sheet division position of the continuous composite strip.

Details of one or more embodiments of this disclosure are provided in the attached drawings and descriptions below.

Other features, purposes, and advantages of this disclosure will become apparent from the specification, the drawings, and the claims.

BRIEF DESCRIPTION OF THE DRAWINGS

In order to more clearly explain the technical solutions in the embodiments of the present disclosure or the prior art, the following provides a brief description of the attached drawings necessary in the description of the embodiments or the prior art. Obviously, the drawings described below are only some embodiments of the present disclosure. Other drawings may also be obtained according to these drawings.

DETAILED DESCRIPTION OF THE EMBODIMENTS

Figure 1:
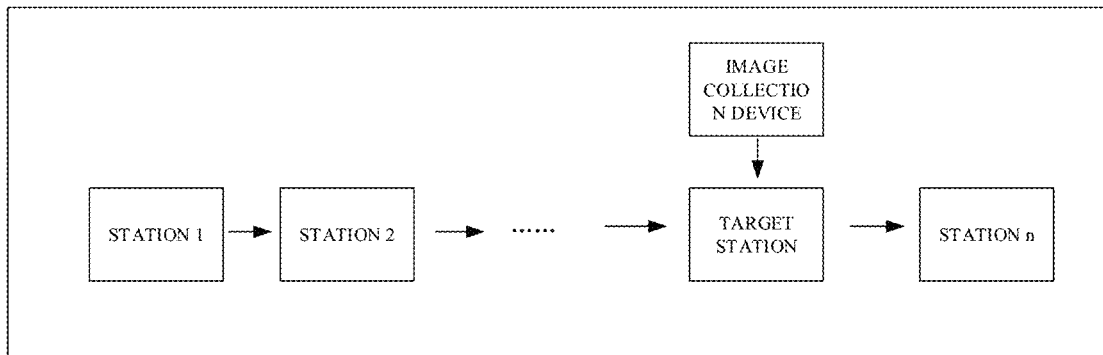
FIG. 1 shows an application scenario of a marking method of a continuous composite strip in one embodiment.

The embodiments of the technical solutions of this disclosure will be described in detail in combination with the attached drawings below. The following embodiments are intended only to more clearly describe the technical solutions of the present disclosure and are therefore used as examples only and cannot be used to limit the scope of protection of the present disclosure.

Unless otherwise defined, all technical and scientific terms used herein have the same meaning as those generally understood by those skilled in the technical field of this disclosure. The terms used herein are for the purpose of describing specific embodiments only and are not intended to limit the disclosure. The terms "including" and "having" and any variations thereof in the specification, claims and the above description of the drawings of this disclosure are intended to cover non-exclusive inclusion.

In the description of the embodiments of this disclosure, the technical terms "first", "second", and etc., are used only to distinguish between different objects and are not to be construed as indicating or implying relative importance or as implicitly indicating the quantity, particular order or priorities of the indicated technical features. In the description of the embodiments of this disclosure, "multiple" means more than two, unless otherwise expressly and specifically specified.

Reference to "embodiments" herein means that a particular feature, structure or characteristic described in conjunction with an embodiment may be included in at least one embodiment of this disclosure. The presence of the phrase at various positions in the specification does not necessarily refer to a same embodiment, nor is it an independent or alternative embodiment mutually exclusive with other embodiments. It is understood, both explicitly and implicitly, by those skilled in the art that the embodiments described herein may be combined with other embodiments.

In the description of the embodiments of this disclosure, the term "and/or" is merely an associative relationship describing associated objects, indicating that there can be three relationships, for example, A and/or B can indicate the following three cases: A alone, both A and B, and B alone. In addition, the character "/" herein generally means that the associated objects are in an "or" relationship.

In the description of the embodiments of this disclosure, the term "multiple" refers to more than two (including two). Similarly, "multiple groups" refers to more than two (including two) groups, and "multiple pieces" refers to more than two (including two) pieces.

In the description of the embodiments of this disclosure, the technical terms "center", "longitudinal", "lateral", "length", "width", "thickness", "up", "down", "front", "back", "left", "right", "vertical" "horizontal", "top", "bottom", "inside", "outside", "clockwise", "anticlockwise", "axial", "radial", "circumferential" and etc. indicates a location or position relationship which is the location or position relationship shown in the drawings. They are used only for the convenience of describing and simplifying the description of the embodiments of this disclosure, and not to indicate or imply that the device or element referred to must have a specific orientation, or be constructed and operated in a specific orientation, and therefore cannot be construed as a limitation of the embodiments of this disclosure.

In the description of the embodiments of this disclosure, unless otherwise expressly specified and limited, the technical terms "installation", "connection", "fixation" and etc. shall be construed in a broad sense, for example, it may be a fixed connection, or a detachable connection, or an one-piece integration; it may be a mechanical connection or an electrical connection; it may be a direct connection, also may be an indirect connection through an intermediate medium, and it may be the connection within two components or an interaction between two components. For those of ordinary skill in the art, the specific meaning of the above terms in the embodiments of this disclosure may be understood on a case-by-case basis.

At present, with the increasingly wide application of power batteries, the related power supplies of new energy vehicles have also been rapidly developed, but there are many problems in the production of batteries. As the core component of a power battery, the cell plays a significant role in the power battery. As concerns a battery, its cell determines the character and quality of the battery, and also affects the battery life and capacity.

In order to improve the character and quality of a battery, it is necessary to detect the quality and character of the electrode sheets of the battery. In order to improve the quality and character of the electrode sheets of the battery, it is practical to detect the defects of the strip of the battery. Nowadays power batteries are formed by a winding process, and when detecting the defects of the strip of a power battery formed by winding, following steps are performed: capturing image information with a linear array camera and performing off-line training to obtain an electrode sheet defects feature library, then capturing images in loops and performing defects detection to the obtained images with the combination of the electrode sheet defects feature library until the detection of the electrode sheets of the whole battery is completed, and automatically marking the defects. During the detection, encoder signals are combined with PLC to mark and record the positions of the defects. This method only involves defects recording and physical marking according to the length position of the current material roll, and does not involve distinguishing the electrode sheets of a continuous stack composite strip including a continuous anode and having the anode combined with cathodes.

At present, the production and forming of power batteries usually adopt the winding process, which is different from the stacking process. The stacking process refers to cutting the positive and negative electrodes into small sheets, and then stacking them with the separator films to form the small cell unit. The winding process refers to forming the power battery through stirring, coating, cold pressing, cutting, welding, winding, top sealing, liquid injection, formation and forming. The two processes are different, and the detection method of a power battery formed by winding process cannot accurately distinguish the electrode sheets of a continuous stack composite strip including a continuous anode and having the anode combined with cathodes, cannot perform marking of the electrode sheets in the continuous composite strip, and cannot locate the defects during the defect detection.

In view of the above, a first sequence of images is obtained by collecting the images of the continuous composite strip; a to-be-detected image with at least one electrode sheet structure is obtained by splicing multiple images of the first sequence of images according to the collection sequence; in case where two electrode sheet edges are identified in the to-be-detected image, the position of the collection-sequentially second electrode sheet edge in the continuous composite strip is marked as the electrode sheet division position of the continuous composite strip; the electrode sheet division position is determined by identifying the electrode sheet edges in the continuous composite strip, and the specific position information of the electrode sheet is obtained, the sheet division marking of the continuous composite strip is accurately performed.

By using the image identification technology and according to the distribution characteristics of the electrode sheets in the continuous composite strip, the electrode sheet edges in the continuous composite strip are identified, and the electrode sheet division positions are determined, and it is possible to distinguish the electrode sheets of the continuous stack composite strip including a continuous anode and having the anode combined with cathodes, to obtain the specific position information of the electrode sheets, and perform the sheet division marking of the continuous composite strip according to the specific position information of the electrode sheets. Further, considering that the length of the continuous composite strip of the cell and the number of layers of the cell in the battery are known, it is possible to obtain the number of the layers of the cell where the electrode sheets are located in the continuous composite strip according to the length of the electrode sheet.

In order to make the purpose, technical solution and advantages of this disclosure more clear, the disclosure is further described in detail in combination with the attached drawings and the embodiments below. It should be understood that the specific embodiments described herein are for the purpose of interpreting the disclosure only and are not intended to limit it.

The embodiments of this disclosure provide a marking method of a continuous composite strip, and illustrate by taking the application of the method to a terminal as an example. It is understood that the method can also be applied to a server, and can also be applied to a system including a terminal and a server and effected through the interaction of the terminal and the server.

By using a pulse to trigger an image collection unit in the terminal to collect images of the continuous composite strip in the travel direction of the strip, a first sequence of images of the continuous composite strip is obtained; a to-be-detected image with at least one electrode sheet structure is obtained by splicing multiple images of the first sequence of images according to the collection sequence; in case where two electrode sheet edges are identified in the to-be-detected image, the position of the collection-sequentially second electrode sheet edge in the continuous composite strip is marked as the electrode sheet division position of the continuous composite strip. In this case, the continuous composite strip may be, but is not limited to, an anode-continuous continuous composite strip. The terminal may be, but is not limited to various personal computers, laptops, smart phones, tablet computers, IoT devices; and may also be a process equipment for the continuous composite strip.

Optionally, the marking method of a continuous composite strip provided in the embodiments of this disclosure may also be applied in the application scenario shown in FIG. 1. The application scenario includes a station 1, a station 2, . . . and a station n. The marking method of a continuous composite strip corresponds to a target station in the station 1, station 2, . . . and station n. An image collection device (which includes different types of cameras, such as line-scan cameras) collects the images of the continuous composite strip at the target station, and the image collection device and the terminal communicate through the network.

By using an encoder to trigger the image collection device to collect a first sequence of images of the continuous composite strip, and caching the collected first sequence of images in a cache of the device, the terminal acquires the first sequence of images from the cache of the device and obtain a to-be-detected image with at least one electrode sheet structure by splicing multiple images of the first sequence of images according to the collection sequence; in case where two electrode sheet edges are identified in the to-be-detected image, the position of the collection-sequentially second electrode sheet edge in the continuous composite strip is marked as the electrode sheet division position of the continuous composite strip.

Figure 2:
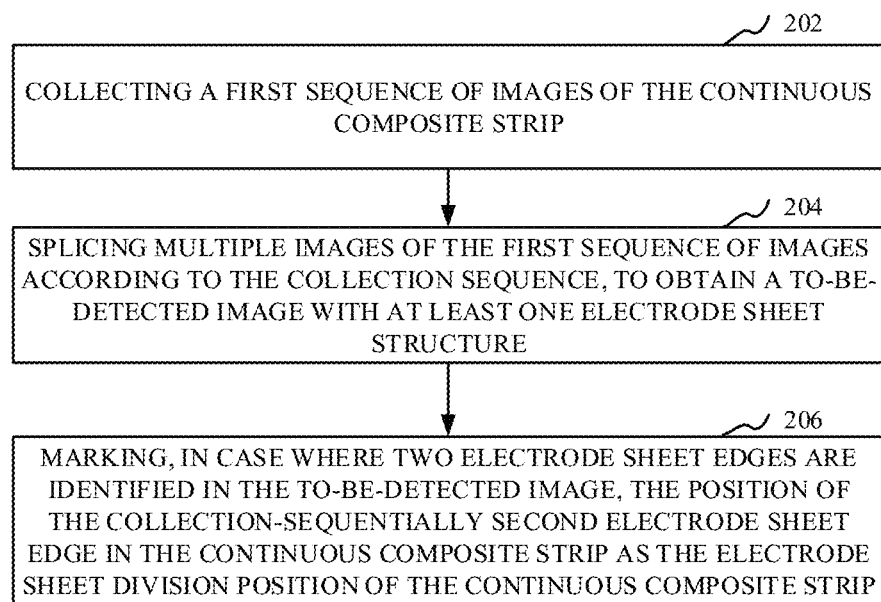
FIG. 2 is a flow chart of a marking method of a continuous composite strip in one embodiment.

In one embodiment, as shown in FIG. 2, a marking method of a continuous composite strip is provided. In an example where the method is applied to a terminal, the method includes the following steps:

Step 202: collecting a first sequence of images of the continuous composite strip.

In this case, the continuous composite strip includes a base strip and layered structure combined on the base strip, and the layered structure and its corresponding base strip together form an electrode sheet structure. The continuous composite strip may include one or more sequentially arranged electrode sheet structures, and the base strip in the multiple electrode sheet structures is the same base strip. That is, from the perspective of the electrode sheet structures, the base strip as a whole is continuous. In this embodiment, an anode-continuous continuous composite strip is taken as an example of the continuous composite strip to describe. The components of the base strip include a separator, an anode strip, and the layered structure includes cathode sheets, cathode tabs and anode tabs. That is, the components of the anode-continuous continuous composite strip include a separator, an anode strip, cathode sheets, cathode tabs and anode tabs.

Figure 3A:
FIG. 3A shows the distribution of a continuous composite strip in one embodiment.
Figure 3B:
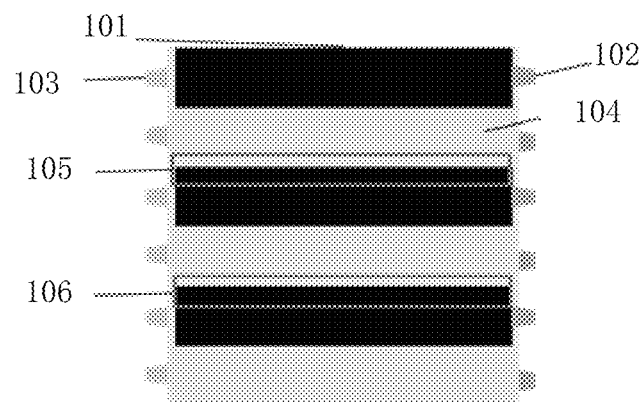
FIG. 3B is a schematic diagram showing an image of a stack composite strip at a non-beginning-and-non-end position in one embodiment.

Optionally, prior to collecting the first sequence of images of the continuous composite strip, the method may also include: determining a preset length of the anode strip, and cutting the anode strip according to the preset length to obtain at least one anode strip segment; covering each anode strip segment with the separator to obtain the base strip; arranging the layered structure sequentially on the upper and lower layers of the base strip to obtain the continuous composite strip. In this case, the preset length is set in advance. Arranging the layered structure includes sequentially arranging the cathode sheets and arranging the cathode tabs and the anode tabs on the upper and lower layers of the base strip. It is understood that, during the production of the anode-continuous stack composite strip, the anode-continuous stack composite strip is obtained by cutting the anode strip according to the preset length, covering the upper and lower layers of the anode strip with the separator, and adhering the cathode sheet alternately on the upper and lower layers. The continuous composite strip is the anode-continuous stack composite strip, and the specific distribution of the stack composite strip is shown in FIG. 3A. A complete stack composite strip is mainly formed by wrapping the anode strip 110 with the upper and lower separators 111, 112, and then alternately combining the upper cathode sheets 108 and the lower cathode sheets 109. The cathode tabs and the anode tabs cannot be shown in FIG. 3A. As shown in FIG. 3B, which is a schematic diagram showing an image of the stack composite strip at a non-beginning-and-non-end position in one embodiment, included are the cathode sheets 101, the cathode tabs 102, the anode tabs 103 (the anode is not shown), the separator region 104 (the cathode is on the back side and now shown, exposing cathode tabs same as 102), and the electrode sheet edge 105 and the electrode sheet edge 106, while the electrode sheet edge 105 and the electrode sheet edge 106 are electrode sheet edges of different cathode sheets.

The anode-continuous stack composite strip includes a front side and a back side. The collected first sequence of images may the sequence of images of either side of the anode-continuous stack composite strip, or may be the sequence of images collected at both sides of the anode-continuous stack composite strip. In this embodiment, description is provided by taking a first sequence of images, which is the sequence of images of one side of the anode-continuous stack composite strip, as an example.

It is understood that batteries are obtained from the anode-continuous stack composite strip through stacking forming process. The anode-continuous stack composite strip needs to be transported to the battery production process in a preset strip travel direction, and goes through the stacking process to result in the cells. The first sequence of images of the anode-continuous stack composite strip collected herein is not limited to a certain process in the battery production process. For example, the collected first sequence of images may be a sequence of images of the anode-continuous stack composite strip during the transportation to the stacking process.

Figure 4:
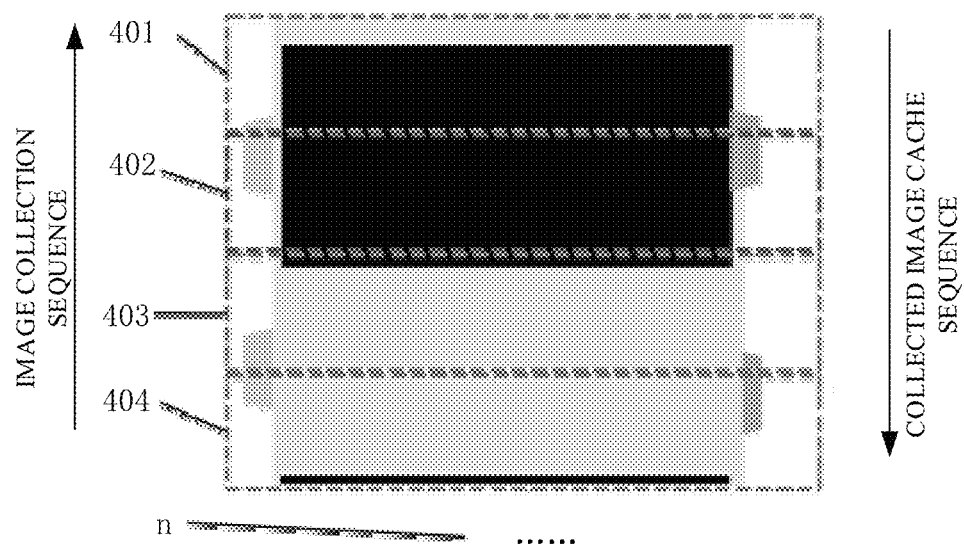
FIG. 4 is a schematic diagram showing image collection and cache of a continuous composite strip in one embodiment.

In particular, the terminal collects the images of the anode-continuous stack composite strip in the strip travel direction of the stack composite strip according to a preset collection frequency, obtains the first sequence of images of either side of the front and back sides of the anode-continuous stack composite strip, and splices each image of the collected first sequence of images according to the collection order to cache to an image cache. As shown in FIG. 4, which is a schematic diagram showing image collection and cache of a stack composite strip in one embodiment, it is assumed that the image collection is triggered according to the preset collection frequency to collect the images, and the images are spliced into the image cache in a sequence that the first arrived image first enters into the cache. The image collection sequence and the collected image cache sequence in FIG. 4 are 401→402→403→404→ . . . →n, and therefore the splicing sequence and the image detection sequence must also be 401→402→403→404→ . . . →n.

Step 204: splicing multiple images of the first sequence of images according to the collection sequence, to obtain a to-be-detected image with at least one electrode sheet structure.

In this case, multiple images of the first sequence images are spliced according to the collection sequence as shown in FIG. 4, and a to-be-detected image with at least one electrode sheet structure is obtained.

Specifically, multiple images of the first sequence of images are spliced from the first sequence of images cached in the image cache according to the collection sequence, to obtain the to-be-detected image with a fixed height. In this case, the fixed height is to ensure that the obtained to-be-detected image includes at least one electrode sheet structure.

Step 206, marking, in case where two electrode sheet edges are identified in the to-be-detected image, the position of the collection-sequentially second electrode sheet edge in the continuous composite strip as the electrode sheet division position of the continuous composite strip.

In this case, the two electrode sheet edges refer to the electrode sheet edges of two successive different cathode sheets on a same side of the anode-continuous stack composite strip. It is understood that the electrode sheet edges herein are the electrode sheet edges of the respectively corresponding cathode sheets at the same position. For example, a cathode sheet includes an upper electrode sheet edge and a lower electrode sheet edge, and the two identified electrode sheet edges may, but are not limited to, the upper electrode sheet edges of two successive different cathode sheets. The two electrode sheet edges include a first electrode sheet edge and a second electrode sheet edge. The first electrode sheet edge and the second electrode sheet edge are determined according to the to-be-detected image identification sequence, which is the same as the image collection sequence.

Specifically, the terminal obtains the strip travel direction of the anode-continuous stack composite strip (that is, the transportation direction of the anode-continuous stack composite strip), and use an edge detection algorithm to perform image identification of the to-be-detected image based on the strip travel direction, determine a target area in the to-be-detected image, and identify whether there are two electrode sheet edges in the image corresponding to the target area. In case where two electrode sheet edges are identified in the to-be-detected image, mark the position of the collection-sequentially second electrode sheet edge in the stack composite strip as the electrode sheet division position of the stack composite strip, and acquire respectively the position coordinates of the two electrode sheet edges in the to-be-detected image, and obtain the position information of the two electrode sheet edges.

In the above marking method of the continuous composite strip, the first sequence of images is obtained by collecting images of the continuous composite strip; a to-be-detected image with at least one electrode sheet structure is obtained by splicing multiple images of the first sequence of images according to the collection sequence; in case where two electrode sheet edges are identified in the to-be-detected image, the position of the collection-sequentially second electrode sheet edge in the continuous composite strip is marked as the electrode sheet division position of the continuous composite strip; the electrode sheet division position is determined by identifying the electrode sheet edges in the continuous composite strip, and the specific position information of the electrode sheet is obtain, the sheet division marking of the continuous composite strip is correctly performed.

Figure 5:
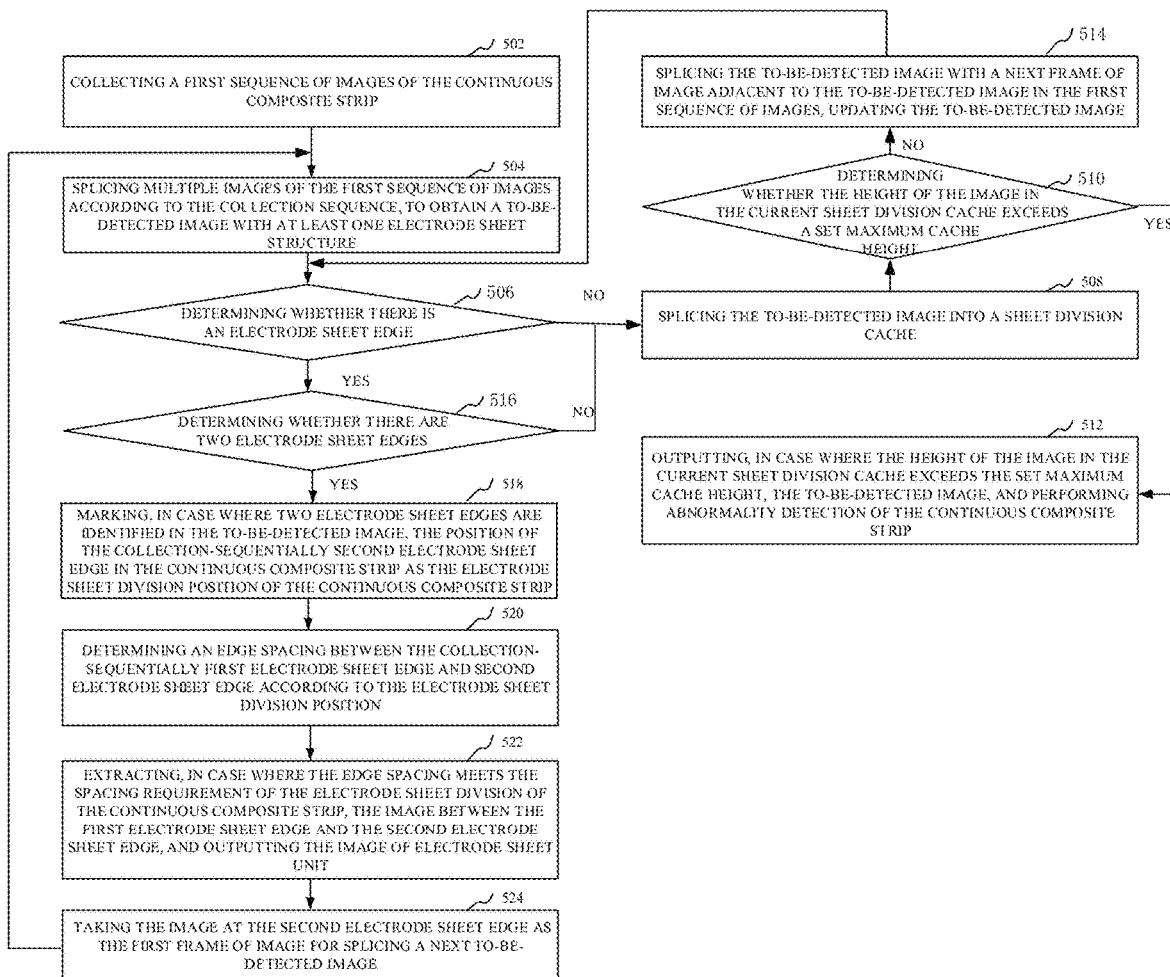
FIG. 5 is a flow chart of a marking method of a continuous composite strip in another embodiment.

In another embodiment, as shown in FIG. 5, a marking method of a continuous composite strip is provided. In an example where the method is applied to a terminal and the continuous composite strip is an anode-continuous composite strip, the method includes the following steps:

Step 502, collecting a first sequence of images of the continuous composite strip.

Step 504, splicing multiple images of the first sequence of images according to the collection sequence, to obtain a to-be-detected image with at least one electrode sheet structure.

Step 506, determining whether there is an electrode sheet edge; if so, performing step 510; otherwise, going to step 508.

Specifically, identify the to-be-detected image, and perform the step 510 if there is an electrode sheet edge, or perform the step 508 if there is no electrode sheet edge.

Step 508, splicing the to-be-detected image into a sheet division cache.

Step 510, determining whether the height of the image in the current sheet division cache exceeds a set maximum cache height; if so, performing step 512; otherwise, performing step 514.

Step 512, outputting, in case where the height of the image in the current sheet division cache exceeds the set maximum cache height, the to-be-detected image, and performing abnormality detection of the continuous composite strip.

Step 514, splicing the to-be-detected image with a next frame of image adjacent to the to-be-detected image in the first sequence of images, updating the to-be-detected image, and returning to the step 506.

Specifically, in case where the height of the image in the current sheet division cache does not exceed the set maximum cache height, splice the image in the current sheet division cache including the to-be-detected image with a next frame of image adjacent to the to-be-detected image in the first sequence of images, to obtain a splicing image, and splice multiple images of the splicing image according to the image collection sequence, to obtain an updated to-be-detected image, and return to the step 506.

Step 516, determining whether there are two electrode sheet edges; if so, performing step 518; otherwise, performing the step 508.

Specifically, in case where two electrode sheet edges are identified in the to-be-detected image, perform the step 518; in case where only one electrode sheet edge is identified in the to-be-detected image, perform the step 508.

Step 518, marking, in case where two electrode sheet edges are identified in the to-be-detected image, the position of the collection-sequentially second electrode sheet edge in the continuous composite strip as the electrode sheet division position of the continuous composite strip.

Specifically, identify the to-be-detected image according to the collection sequence. In case where the first electrode sheet edge and the second electrode sheet edge are identified in the to-be-detected image, mark the position of the collection-sequentially second electrode sheet edge in the stack composite strip as the electrode sheet division position of the stack composite strip.

Optionally, in one embodiment, in case where only one electrode sheet edge is identified in the to-be-detected image, splice the to-be-detected image with a next frame of image adjacent to the to-be-detected image in the first sequence of images, and update the to-be-detected image.

Specifically, in case where only one electrode sheet edge is identified in the to-be-detected image, splice the to-be-detected image into the sheet division cache according to the collection sequence, in case where the height of the image in the current sheet division cache does not exceed the set maximum cache height, splice the cached to-be-detected image with a next frame of image adjacent to the to-be-detected image in the first sequence of images, update the to-be-detected image, and re-perform the electrode sheet edge identification of the obtained new to-be-detected image to increase the accuracy of the sheet division marking of the continuous composite strip.

Further, in case where the height of the current image in the sheet division cache exceeds the set maximum cache height, output the currently cached image in the sheet division cache, and clear the image data in the sheet division cache; generate an image abnormality prompt information; the image abnormality prompt information is used to prompt the user terminal to perform the abnormality detection of the currently cached image in the sheet division cache, determine the abnormality of the corresponding continuous composite strip through the anomality detection, and determine the current abnormality position information according to the previous sheet division position.

Optionally, in one embodiment, the first sequence of images of the first side of the continuous composite strip is collected; multiple images of the first sequence of images are spliced according to the collection sequence to obtain the to-be-detected image with at least one electrode sheet structure; in case where two electrode sheet edges are identified in the to-be-detected image, the position of the collection-sequentially second electrode sheet edge in the continuous composite strip is marked as the electrode sheet division position on the first side of the continuous composite strip.

A second sequence of images of the continuous composite strip is collected during transportation to the stacking process. The second sequence of images is collected for the second side of the continuous composite strip, and the first side and the second side are the opposite sides of the continuous composite strip. Multiple images of the second sequence of images are spliced according to the collection sequence of the second sequence of images, and a to-be-detected image with at least one electrode sheet structure is obtained. In case where two electrode sheet edges are identified in the to-be-detected image, the position of the collection-sequentially second electrode sheet edge in the continuous composite strip is marked as the electrode sheet division position of the continuous composite strip, and the electrode sheet division position on the second side of the continuous composite strip is obtained. In case where the electrode sheet division position on the first side of the continuous composite strip is same as the electrode sheet division position on the second side, the electrode sheet division position of the continuous composite strip is determined.

It is understood that, as concerns the same continuous composite strip, in case where the continuous composite strip does no have abnormality, the electrode sheet division positions of a same segment of the continuous composite strip determined on the opposite sides of the continuous composite strip are the same. By determining whether the electrode sheet division positions on the first side and on the second side are same electrode sheet division position, the final electrode sheet division position of the continuous composite strip is determined, and on the basis of the determination of the specific position information of the electrode sheet, the accuracy of the sheet division marking of the continuous composite strip is further improved.

Step 520, determining an edge spacing between the collection-sequentially first electrode sheet edge and second electrode sheet edge according to the electrode sheet division position.

Specifically, determine respectively the position coordinates of the collection-sequentially first electrode sheet edge and second electrode sheet edge in the to-be-detected image according to the electrode sheet division position, to obtain the position coordinates of two electrode sheet edges; and determine the edge spacing between the first electrode sheet edge and the second electrode sheet edge according to the position coordinates of the first electrode sheet edge and of the second electrode sheet edge.

Step 522, extracting, in case where the edge spacing meets the spacing requirement of the electrode sheet division of the continuous composite strip, the image between the first electrode sheet edge and the second electrode sheet edge, and outputting the image of electrode sheet unit.

In this case, the spacing requirement is set in advance. The image of electrode sheet unit contains a complete electrode sheet structure.

Figure 6:
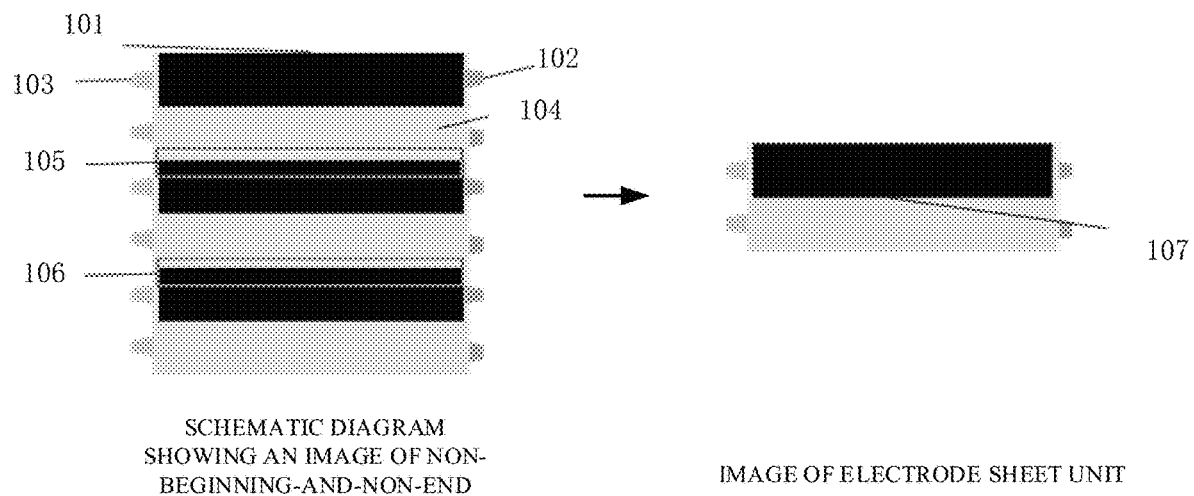
FIG. 6 is a schematic diagram showing an image of a non-beginning-and-non-end of an anode-continuous stack composite strip and an image of electrode sheet unit in one embodiment.

Further, the anode-continuous stack composite strip comprises a beginning sheet and an end sheet, which can be understood as the first electrode sheet and the last electrode sheet of the cell. The schematic diagram showing the image of the stack composite strip at the position of the end sheet is different from the schematic diagram showing the image of the stack composite strip at the non-beginning-and-non-end position. FIG. 6 is a schematic diagram showing an image of a non-beginning-and-non-end sheet of an anode-continuous stack composite strip and an image of electrode sheet unit in one embodiment. In this case, 101 indicates the cathode sheets, 102 indicates the cathode tabs, 103 indicates the anode tabs (the anode is not shown), 104 indicates the separator region (the cathode is on the back side and now shown, exposing cathode tabs same as 102), and 105 and 106 indicate the upper electrode sheet edges of the cathode sheets, respectively. The above marking method of the anode-continuous stack composite strip is applied, the to-be-detected image corresponding to the continuous stack composite strip is divided into unit images 107, i.e., the images of electrode sheet unit, by successively identifying the upper electrode sheet edges 105 and 106 of two cathode sheets, and determining according to parameters such as the number of tabs, the height of the image. The image of electrode sheet unit only contains one piece of visible cathode and one piece of visible separator region.

Figure 7A:
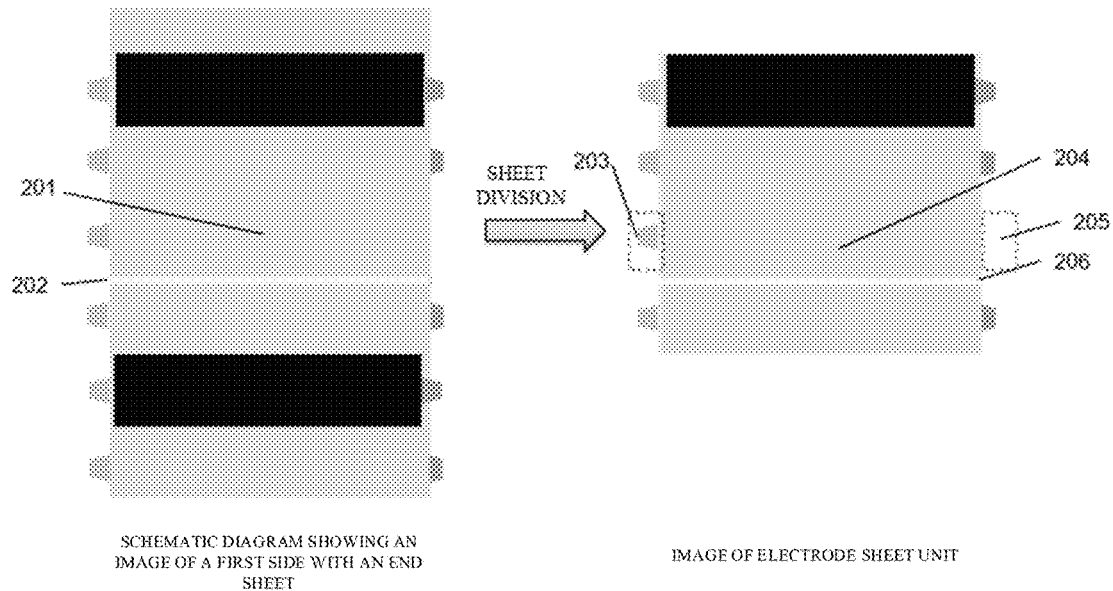
FIG. 7A is a schematic diagram showing an image of a first side of a continuous composite strip with an end sheet and an image of electrode sheet unit in one embodiment.
Figure 7B:
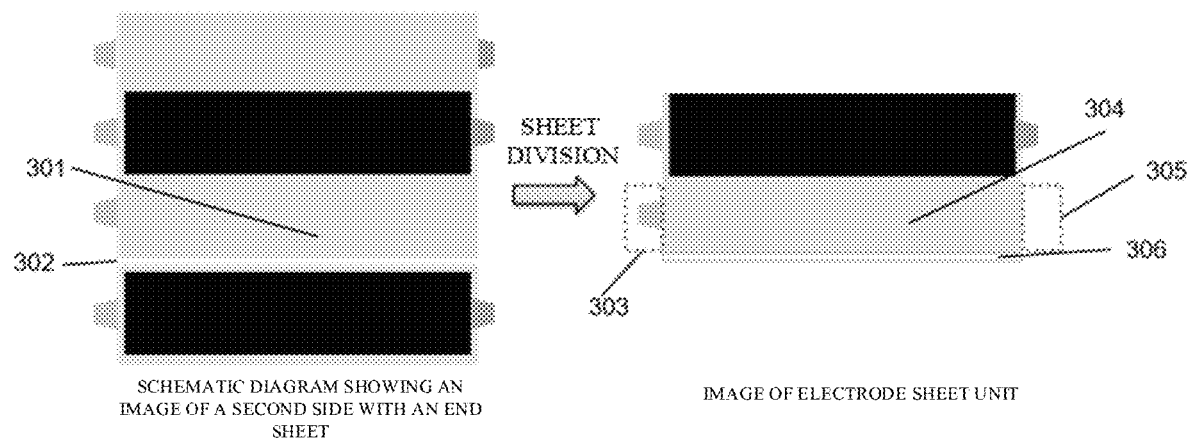
FIG. 7B is a schematic diagram showing an image of a second side of a continuous composite strip with an end sheet and an image of electrode sheet unit in one embodiment.

It can be understood that the images are collected on the front and back sides of the continuous composite strip. In case where the edge spacing meets the spacing requirement of the electrode sheet division of the continuous composite strip, the image between the first electrode sheet edge and the second electrode sheet edge is extracted, and the images of electrode sheet unit on the front and back sides of the continuous composite strip are output. FIG. 7A shows an image of a first side of a continuous composite strip with an end sheet and an image of electrode sheet unit in one embodiment. In this case, 201 and 204 indicate the separator regions, 202 and 206 indicate the cell division marks (i.e., the blank area), 203 indicates the anode tabs, and 205 indicates the empty area. It is understood that 205 should indicate a cathode tab in case where it is the non-beginning-and-non-end position. FIG. 7B shows an image of a second side of a continuous composite strip with an end sheet and an image of electrode sheet unit in one embodiment. In this case, 301 and 304 indicate the separator regions, 302 and 306 indicate the cell division marks (i.e., the blank area), 303 indicates the anode tabs, and 305 indicates the empty area. It is understood that 305 should indicate a cathode tab in case where it is the non-beginning-and-non-end position. FIG. 7A and FIG. 7B are schematic diagrams showing images of the front and back sides of the continuous composite strip and the image of electrode sheet unit after sheet division. In this case, the first side may be the front side or may be the back side, and the second side may be the front side or may be the back side.

Optionally, in one embodiment, the image of electrode sheet unit is stored after the image of electrode sheet unit is obtained. Through strip detection (for example, the strip appearance detection) of the image of electrode sheet unit, identify whether the corresponding continuous composite strip has abnormality, and mark the continuous composite strip corresponding to each image of electrode sheet unit, to bind the production data of the production process with the data of the image of electrode sheet unit.

Step 524, taking the image at the second electrode sheet edge as the first frame of image for splicing a next to-be-detected image, and returning to the step 504.

Specifically, take the image at the second electrode sheet edge as the first frame of image for splicing the next to-be-detected image, and continue to perform the step of splicing multiple images of the first sequence of images according to the collection sequence to obtain a to-be-detected image with at least one electrode sheet structure, complete the electrode sheet division of the stack composite strip, and realize marking the electrode sheet units on the stack composite strip, and obtain the marking information of each electrode sheet unit on the stack composite strip.

Figure 8:
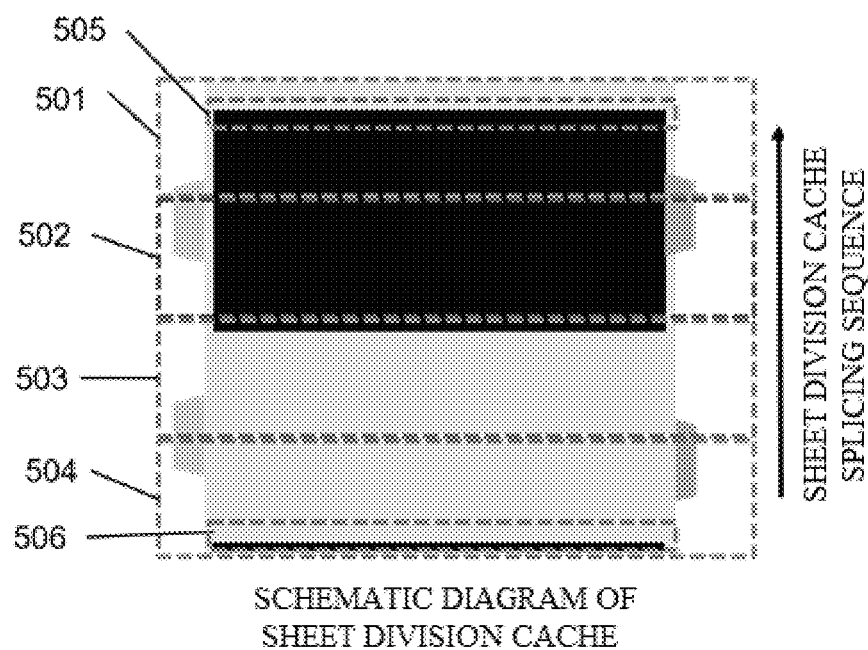
FIG. 8 is a schematic diagram showing splicing of images of a continuous composite strip in one embodiment.

In one embodiment, the images in the image cache are sequentially spliced to a certain height according to the collection sequence 401→404→ . . . N, as shown in FIG. 8. Perform edge detection of the image 501 in FIG. 8 through the edge detection algorithm to detect the edge in the strip travel direction, and determine whether the first electrode sheet edge 505 is detected. In case where no electrode sheet edge 505 is detected, put the image into the sheet division cache, and in case where an electrode sheet edge 505 is detected, record the coordinate information of the current position and determine whether there are two edges (for example, 505 and 506 in FIG. 8). In case where there are collection-sequentially two electrode sheet edges, mark the position of the collection-sequentially second electrode sheet edge in the stack composite strip as the electrode sheet division position of the stack composite strip. Determine the edge spacing between the collection-sequentially first electrode sheet edge and second electrode sheet edge according to the electrode sheet division position. In case where the edge spacing meets the spacing requirement of the electrode sheet division of the stack composite strip, extract the image between the first electrode sheet edge and the second electrode sheet edge, and output the image of electrode sheet unit. Take the image at the second electrode sheet edge as the first frame of image for splicing the next to-be-detected image, and continue performing the steps of splicing multiple images in the first sequence of images according to the collection sequence to obtain the to-be-detected image with at least one electrode sheet structure. That is to say, considering FIG. 8, to extract the picture (which can be called an image) between the two edges may be to clear the image data above 506 and then move up the image below 506 to the start position of the sheet division cache, and take the start position as the first edge position of the next electrode sheet by default.

In case where the edge spacing does not meet the spacing requirement of the electrode sheet division of the continuous composite strip, manual intervention is carried out to perform the abnormality detection of the continuous composite strip.

In this case, it is understood that in case where the to-be-detected image does not meet the sheet division conditions, splice the currently detected image into the sheet division cache according to a sequence (for example, the splicing sequence is from top to bottom 501→502→503→504 in case the detection sequence is 501→502→503→504), then determine whether the height of the image in the current sheet division cache exceeds the set maximum cache height, if so, output the image cached in the current cache, and clear the image data in the sheet division cache and carry out manual intervention to perform the abnormality detection of the stack composite strip; if not, splice the to-be-detected image with the next frame of image adjacent to the to-be-detected image in the first sequence of images, update the to-be-detected image, and perform edge detection in loops.

In the above marking method of the anode-continuous stack composite strip, the to-be-detected image with at least one electrode sheet structure is obtained by collecting the first sequence of images of the anode-continuous stack composite strip, splicing multiple images of the first sequence of images according to the collection sequence; the electrode sheet division position of the anode-continuous stack composite strip is correctly marked according to the identified number of the electrode sheet edges in the to-be-detected image. According to the marked electrode sheet division position, the edge spacing between the first electrode sheet edge and the second electrode sheet edge in the image acquisition sequence is obtained. In case where the edge spacing meets the spacing requirement of the electrode sheet division of the stack composite strip, the image of electrode sheet unit of the electrode sheet unit on the stack composite strip is obtained. The image of electrode sheet unit can be used for the strip detection of the stack composite strip. At the same time, in case where the previous electrode sheet division position of the anode-continuous stack composite strip is determined, the image at the second electrode sheet edge corresponding to the previous electrode sheet division position is used as the first frame of image for splicing the next to-be-detected image. Return to the step of splicing multiple images in the sequence of images according to the collection sequence to obtain the to-be-detected image with at least one electrode sheet structure, and sequentially obtain all electrode sheet division positions in the anode-continuous stack composite strip, so as to complete the sheet division marking of the anode-continuous stack composite strip, and ensure the completeness of the marking information of the anode-continuous stack composite strip.

Figure 9:
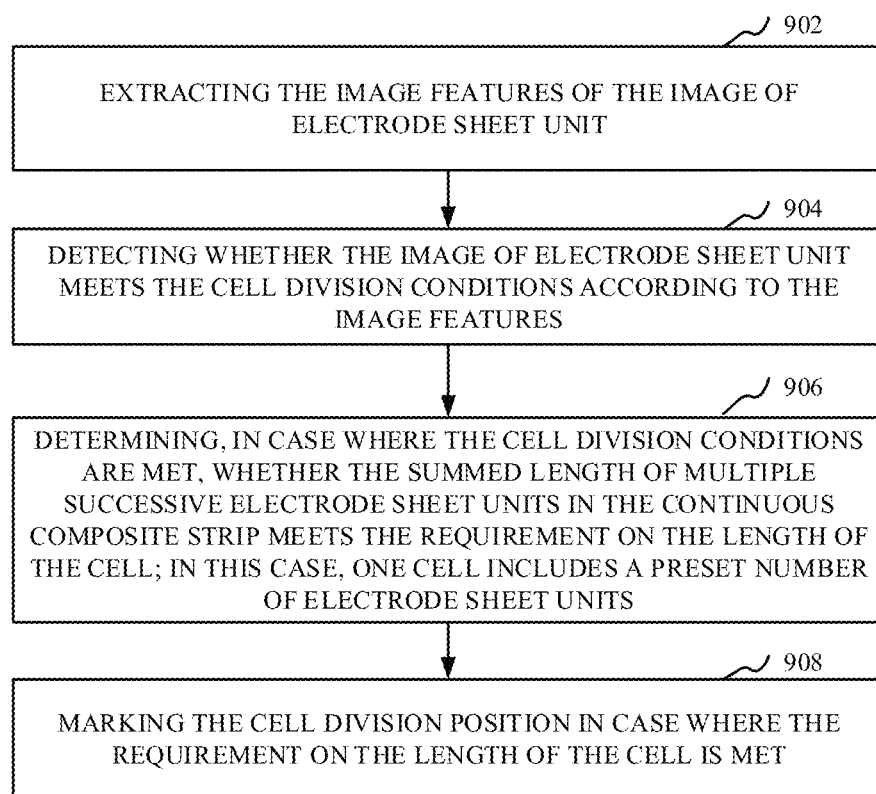
FIG. 9 is a flow chart of a cell division method in one embodiment.

In one embodiment, as shown in FIG. 9, a cell division method is provided. As described in an example where the steps are applied to the terminal and the continuous composite strip is an anode-continuous continuous composite strip, the method includes:

Step 902, extracting the image features of the image of electrode sheet unit.

In this case, the cell is the core component of the power battery. For a particular power battery, the number of layers of the cell and the length of the cell in the battery are known. The number of layers of the cell and the length of the cell are also known for the battery obtained by stacking the anode-continuous stack composite strip. Image features include the number of anode and cathode tabs and the end mark of the cell. The end mark of the cell is a mark of cell division, and in the image of electrode sheet unit the end mark of the cell is represented by the pixel value of the image which is a specific value. In the anode-continuous stack composite strip, the corresponding position of the end mark of the cell tail is the position of the division of the anode strip, which is shown as a blank area on the image of electrode sheet unit (for example, 202 and 206 in FIG. 7A, 302 and 306 in FIG. 7B). The image of electrode sheet unit includes the image of electrode sheet unit of the anode-continuous stack composite strip with the beginning and end images and the image of electrode sheet unit without the beginning and end images.

Specifically, apply the Blob algorithm to identify the image of electrode sheet unit, and determine a first target region, a second target region and a third target region in the image of electrode sheet unit. Perform features extraction of the first target region, the second target region and the third target region, and obtain respectively the corresponding number of the cathode tabs, number of the anode tabs and the end mark of the cell.

Step 904, detecting whether the image of electrode sheet unit meets the cell division conditions according to the image features.

In this case, the cell division conditions include that the number of the cathode tabs and the number of the anode tabs is not equal, and that there is a blank area in the image of electrode sheet unit.

Specifically, apply the Blob algorithm to detect whether the difference of the numbers of the cathode tabs and the anode tabs, which is one of the image features, meets the requirement on the difference of the numbers, which is one cell division condition; in case where the requirement on the difference of the numbers of the cell division conditions is met, detect whether the end mark of the cell, which is one of the image features, meets the requirement on the end mark, which is one cell division condition; in case where the requirement on the end mark of the cell division conditions is met, determine that the cell division conditions are met. Further, in case where the image of electrode sheet unit meets the cell division conditions, the image of electrode sheet unit is the image of electrode sheet unit at the end portion of the anode-continuous stack composite strip. Optionally, if in the image of electrode sheet unit, the difference between the numbers of the anode tabs and the cathode tabs of the image features meets the requirement on the difference of the numbers of the cell division conditions, and the end mark of the cell meets the requirement on end mark (that is, the blank area) of the cell division conditions, then the image corresponding to the image of electrode sheet unit is the image of the end portion of the continuous composite strip.

Step 906, determining, in case where the cell division conditions are met, whether the summed length of multiple successive electrode sheet units in the continuous composite strip meets the requirement on the length of the cell. In this case, one cell includes a preset number of electrode sheet units.

Step 908, marking the cell division position in case where the requirement on the length of the cell is met.

Specifically, in case where the requirement on the length of the cell is met, mark the position of the end mark of the cell of the image features in the continuous composite strip as the cell division position. Further, according to the requirement on the length of the cell, determine the cell to which each image of electrode sheet unit belongs and the number of the layer where the cell is located. Bind the production data of each process in the subsequent production processes with each image of electrode sheet unit, the cell to which each image of electrode sheet unit belongs and the number of the layer where the cell is located, so as to facilitate the data storage and the production data tracing.

Besides, when performing the fault and defect detection of the image of electrode sheet unit, determine the fault cell and the number of the fault layer according to the image of electrode sheet unit where the defect is located, so as to accurately locate the fault and shorten the troubleshooting time for locating the fault.

In the above embodiments, the image of electrode sheet unit is output in case where the electrode sheet division position of the continuous composite strip is marked, and the edge spacing between the collection-sequentially first electrode sheet edge and second electrode sheet edge is determined to meet the spacing requirement of the electrode sheet division of the continuous composite strip according to the electrode sheet division position. Through the image feature detection of the image of electrode sheet unit, determine whether the cell division conditions are met, and whether the summed length of the multiple successive electrode sheet units in the continuous composite strip meets the requirement on the length of the cell. In case where both the cell division conditions and the requirement on the length of the cell are met, determine the cell division position. By performing the electrode sheet division and the cell division of the continuous composite strip, the cell to which each electrode sheet unit belongs can be determined. And by binding the data of the continuous composite strip in each process with the corresponding electrode sheet unit and the cell corresponding to the electrode sheet unit, it is possible to realize the data tracing and data storage of the continuous composite strip.

Figure 10:
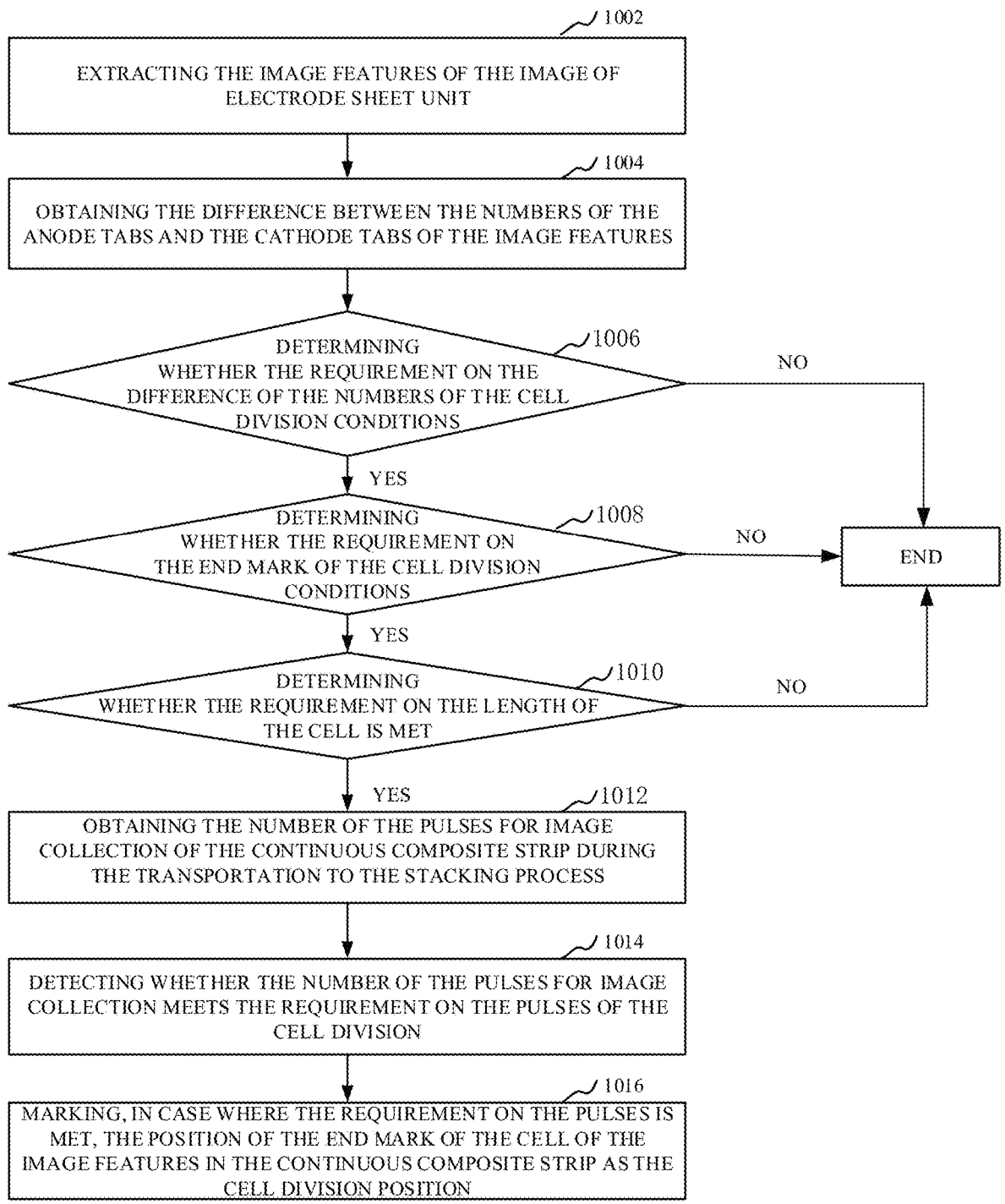
FIG. 10 is a flow diagram of a cell division method in another embodiment.

In another embodiment, as shown in FIG. 10, a cell division method is provided. As described in an example where the method is applied to the terminal and the continuous composite strip is an anode-continuous continuous composite strip, the method includes:

Step 1002, extracting the image features of the image of electrode sheet unit.

Step 1004, obtaining the difference between the numbers of the anode tabs and the cathode tabs, which is one of the image features.

Specifically, obtaining the number of the cathode tabs and the number of the anode tabs, which are among the image features, to obtain the difference between the numbers of the cathode tabs and the anode tabs.

Step 1006, determining whether the requirement on the difference of the numbers, which is one of the cell division conditions, is met; if so, performing step 1008; otherwise, ending the flow.

Specifically, determine whether the difference of the numbers of the anode tabs and the cathode tabs meets the requirement on the difference of the numbers of the cell division conditions; if so, perform the step 1008; otherwise, end the flow.

Step 1008, determining whether the requirement on the end mark, which is one of the cell division conditions, is met; if so, performing step 1010; otherwise, ending the flow.

Specifically, in case where the requirement on the difference of the numbers of the cell division conditions is met, detect whether the end mark of the cell of the image features meets the requirement on the end mark of the cell division conditions, and in case where the requirement on the end mark of the cell division conditions is met, determine that the cell division conditions are met.

Step 1010, determining whether the requirement on the length of the cell is met; if so, performing step 1012; otherwise, ending the flow.

Specifically, in case where the cell division conditions are met, determine whether the summed length of the multiple successive electrode sheet units in the continuous composite strip meets the requirement on the length of the cell; in this case, one cell includes a preset number of electrode sheet units;

Step 1012, obtaining the number of the pulses for image collection of the continuous composite strip during the transportation to the stacking process.

In this case, the number of the pulses for image collection refers to the counted number of the pulses from the encoder in the interval from the beginning sheet to the end sheet of the continuous composite strip.

Step 1014, detecting whether the number of the pulses for image collection meets the requirement on the pulses of the cell division.

In this case, the requirement on the pulses of the cell division refers to the number of the pulses for image collection allowed by the length of one cell.

Step 1016, marking, in case where the requirement on the pulses is met, the position of the end mark of the cell of the image features in the continuous composite strip as the cell division position.

Specifically, in case where the requirement on the pulses is met, mark the position of the end mark of the cell of the image features in the stack composite strip as the cell division position; use the PLC to obtain the virtual code of the current strip, and sequentially bind all the electrode sheets between the beginning sheet and the end sheet of the current cell into the virtual code. The virtual code of the current strip may be understood as the virtual code of the current cell. The virtual code refers to an identification used to identify different cells, and may be numbers, letters, and a combination of numbers and letters, etc.

Figure 11:
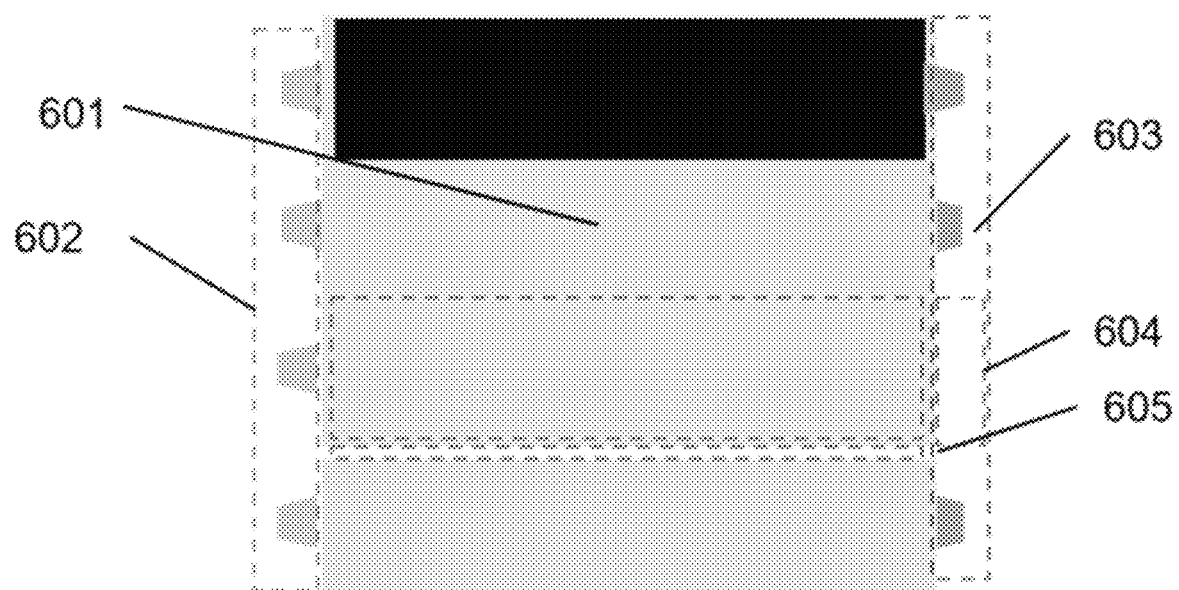
FIG. 11 is a schematic diagram showing an image of electrode sheet unit in one embodiment.

In one embodiment, the obtained image of electrode sheet unit is as shown in FIG. 11. Apply the Blob algorithm to detects the number of the anode tabs in the area 602, and detect the number of the cathode tabs in the region 603, determine whether the numbers of the anode tabs and the cathode tabs are consistent, and if they are the same, perform the defect detection, if not, apply the Blob algorithm to determine whether the requirement on the end mark of the cell of the cell division conditions is met (that is, whether there is a blank area). If there is no blank area, perform the defect detection, if there is, determine whether the requirement on the length of the cell is met, that is, determine whether the summed height of the images of the current cell meets the cell division conditions (that is, whether it is within the length specification of a cell strip). If not met, carry out the manual intervention; if met, obtain the number of the pulses for image collection of the stack composite strip during the transportation to the stacking process, that is, count the number of the pulses from the encoder in the interval from the beginning sheet to the end sheet, determine whether the number of the pulses for image collection meets the requirement on the pulses of the cell division, and in case where the requirement on the pulses is met, mark the position of the end mark of the cell of the image features in the stack composite strip as the cell division position, use the PLC to obtain the virtual code of the current strip, and sequentially bind all the electrode sheets between the beginning sheet and the end sheet of the current cell into the virtual code; and in case where the requirement on the pulses is not met, give an abnormality alarm and carry out the manual intervention.

In this embodiment, in case where the detection of the image of electrode sheet unit shows that the difference of the numbers of the anode tabs and the cathode tabs of the image features meets the requirement on the difference of the numbers of the cell division conditions, and that the end mark of the cell meets the requirement on the end mark of the cell division conditions, perform error correction of the cell division position by obtaining the number of the pulses for image collection of the continuous composite strip during the transportation to the stacking process, so as to improve the accuracy of marking the cell division position. At the same time, bind the data of the continuous composite strip in each process specifically with the corresponding electrode sheet unit and the cell corresponding to the electrode sheet unit, which can realize the data storage and tracing of the continuous composite strip.

Figure 12:
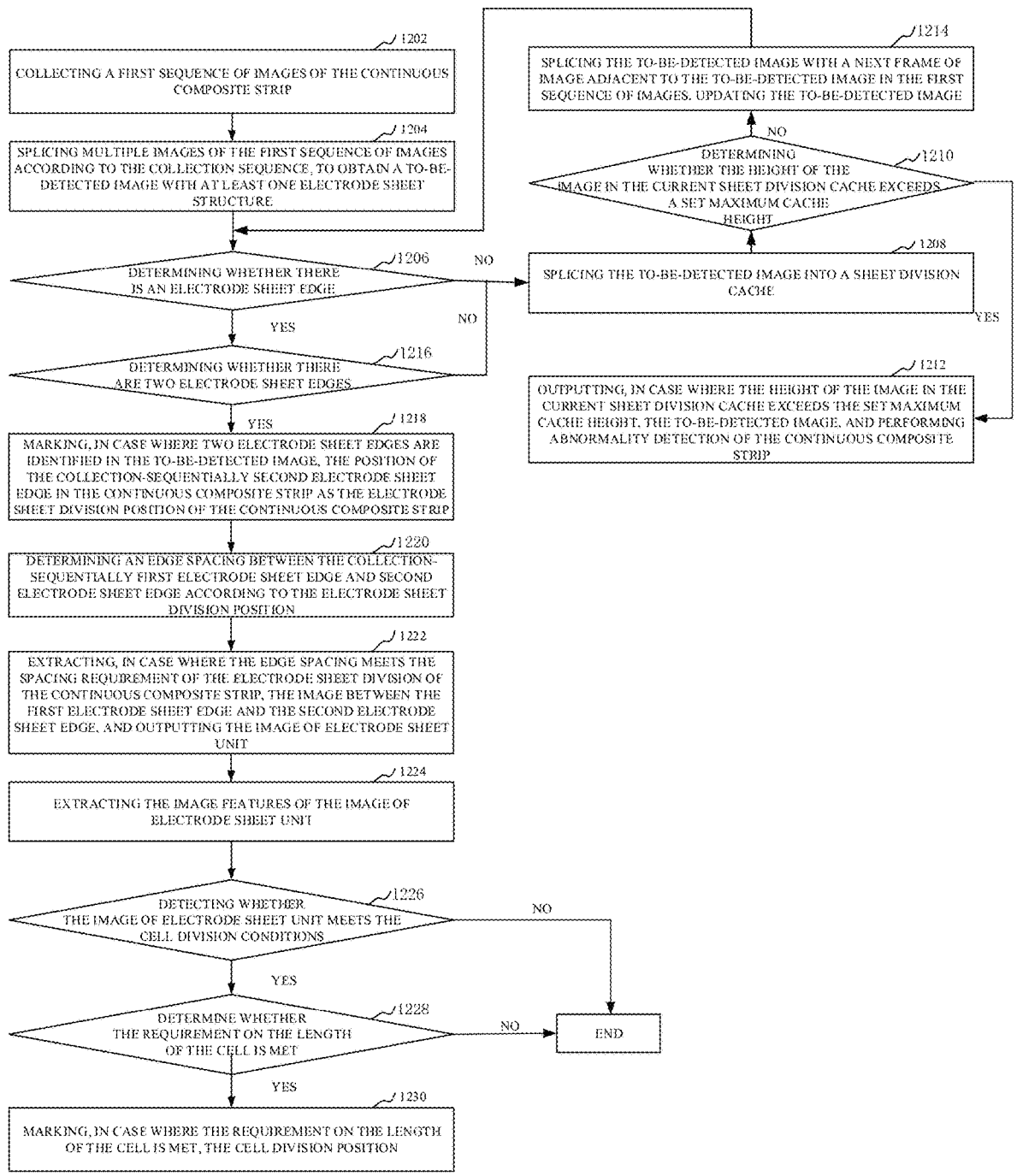
FIG. 12 is a schematic flow chart of a marking method of a continuous composite strip in another embodiment.

In another embodiment, as shown in FIG. 12, a marking method of a continuous composite strip is provided. As described in an example where the steps are applied to the terminal and the continuous composite strip is an anode-continuous composite strip, the method includes:

Step 1202, collecting a first sequence of images of the continuous composite strip.

Step 1204, splicing multiple images of the first sequence of images according to the collection sequence, to obtain a to-be-detected image with at least one electrode sheet structure.

Step 1206, identifying the to-be-detected image; if there is an electrode sheet edge, performing step 1216; otherwise, performing step 1208.

Step 1208, splicing the to-be-detected image into a sheet division cache.

Step 1210, determining whether the height of the image in the current sheet division cache exceeds a set maximum cache height; if so, performing step 1212; otherwise, performing step 1214.

Step 1212, outputting, in case where the height of the image in the current sheet division cache exceeds the set maximum cache height, the to-be-detected image, and performing abnormality detection of the continuous composite strip.

Step 1214, splicing the to-be-detected image with a next frame of image adjacent to the to-be-detected image in the first sequence of images, updating the to-be-detected image, and returning to the step 1206.

Step 1216, determining whether there are two electrode sheet edges; if so, performing step 1218; otherwise, performing the step 1208.

Step 1218, marking, in case where two electrode sheet edges are identified in the to-be-detected image, the position of the collection-sequentially second electrode sheet edge in the continuous composite strip as the electrode sheet division position of the continuous composite strip.

Step 1220, determining an edge spacing between the collection-sequentially first electrode sheet edge and second electrode sheet edge according to the electrode sheet division position.

Step 1222, extracting, in case where the edge spacing meets the spacing requirement of the electrode sheet division of the continuous composite strip, the image between the first electrode sheet edge and the second electrode sheet edge, and outputting the image of electrode sheet unit.

Step 1224, extracting the image features of the image of electrode sheet unit.

Step 1226, detecting whether the image of electrode sheet unit meets the cell division conditions; if so, performing step 1228; otherwise, ending the flow.

Specifically, detect whether the difference of the numbers of the cathode tabs and the anode tabs of the image features meets the requirement on the difference of the numbers of the cell division conditions. In this case, the requirement on the difference of the numbers of the cell division conditions is that the difference of the numbers of the anode tabs and the cathode tabs is not a preset value (that is, 0). In case where the requirement on the difference of the numbers of the cell division condition is met, detect whether the end mark of the cell of the image features meets the requirement on the end mark of the cell division conditions, and in case where the requirement on the end mark of the cell division conditions is met, determine that the cell division conditions are met.

Step 1228, determining whether the requirement on the length of the cell is met; if so, performing step 1230; otherwise, ending the flow.

Specifically, determine whether the cell division conditions are met, and in case where the cell division conditions are met, determine whether the summed length of the multiple successive electrode sheet units in the stack composite strip meets the requirement on the length of the cell; in this case, one cell includes a preset number of electrode sheet units.

Step 1230, marking, in case where the requirement on the length of the cell is met, the cell division position.

Specifically, in case where the requirement on the length of the cell is met, mark the position of the end mark of the cell of the image features in the stack composite strip as the cell division position. Use the PLC to obtain the virtual code of the current strip, and sequentially bind all the electrode sheets between the beginning sheet and the end sheet of the current cell into the virtual code. The virtual code of the current strip may be understood as the virtual code of the current cell.

In the above embodiments, in case where the cell division position of the stack composite strip is marked and the edge spacing between the collection-sequentially first electrode sheet edge and second electrode sheet edge is determined according to the electrode sheet division position to meet the spacing requirement of the electrode sheet division of the stack composite strip, output the image of electrode sheet unit. Through the image feature detection of the image of electrode sheet unit, determine whether the cell division conditions are met, and whether the summed length of the multiple successive electrode sheet units in the stack composite strip meets the requirement on the length of the cell. In case where both the cell division conditions and the requirement on the length of the cell are met, determine the cell division position. By performing the electrode sheet division and the cell division of the anode-continuous stack composite strip, the cell to which each electrode sheet unit belongs can be determined. And by binding the data of the stack composite strip in each process specifically with the corresponding electrode sheet unit and the cell corresponding to the electrode sheet unit, it is possible to realize the data tracing and data storage of the stack composite strip.

It is understood that although the steps in the flow chart involved in the embodiments described above are shown sequentially as indicated by the arrows, these steps are not necessarily performed sequentially in the order indicated by the arrows. Unless explicitly stated herein, there is no strict order in which these steps are performed, and the steps may be performed in other order. Moreover, at least some of the steps in the flow chart referred to in the embodiments mentioned above may include multiple steps or stages, which are not necessarily completed at the same time, but may be executed at different times. And the sequence of execution of these steps or stages is not necessarily sequential, but may be performed alternately or interchangeably with other steps or with at least part of steps or stages within other steps.

Based on the same inventive concept, the embodiments of the present disclosure also provide a marking apparatus of a continuous composite strip for implementing the above-mentioned marking method of the continuous composite strip. The implementations provided by the apparatus to solve the problem are similar to the implementations recited in the above method, so for the specific limitations of the embodiments of the marking apparatus of one or more continuous composite strips provided below, one may refer to the limitations of the above marking method of the continuous composite strip, which will not be repeated here.

Figure 13:
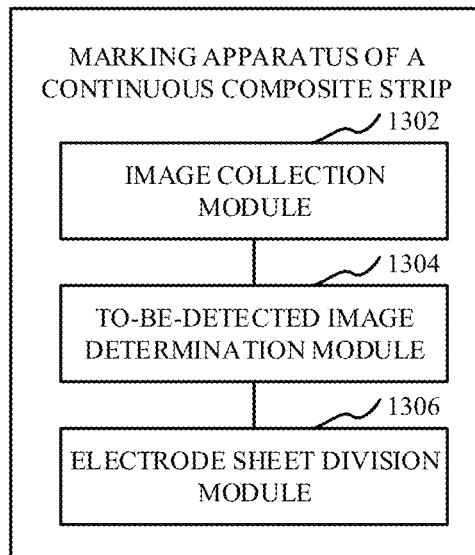
FIG. 13 is a structural block diagram of a marking apparatus of a continuous composite strip in one embodiment.

In one embodiment, as shown in FIG. 13, a marking apparatus of a continuous composite strip is provided, which includes: an image collection module 1302, a to-be-detected image determination module 1304, and an electrode sheet division module 1306, in which:

The image collection module 1302 is used for collecting a first sequence of images of the continuous composite strip during transportation to the stacking process.

The to-be-detected image determination module 1304 is used for splicing multiple images of the first sequence of images according to the collection sequence, to obtain a to-be-detected image with at least one electrode sheet structure.

The electrode sheet division module 1306 is used for marking, in case where two electrode sheet edges are identified in the to-be-detected image, the position of the collection-sequentially second electrode sheet edge in the continuous composite strip as the electrode sheet division position of the continuous composite strip.

The above marking apparatus of the continuous composite strip obtains a first sequence of images by collecting the images of the continuous composite strip; obtains a to-be-detected image with at least one electrode sheet structure by splicing multiple images of the first sequence of images according to the collection sequence; marks, in case where two electrode sheet edges are identified in the to-be-detected image, the position of the collection-sequentially second electrode sheet edge in the continuous composite strip as the electrode sheet division position of the continuous composite strip; determines the electrode sheet division position by identifying the electrode sheet edges in the continuous composite strip, and obtains the specific position information of the electrode sheet, correctly performs the sheet division marking of the continuous composite strip.

In one embodiment, the to-be-detected image determination module 1304 is further used for splicing, in case where the electrode sheet division module 1306 identifies only one electrode sheet edge in the to-be-detected image, the to-be-detected image with a next frame of image adjacent to the to-be-detected image in the first sequence of images, updating the to-be-detected image.

In one embodiment, the to-be-detected image determination module 1304 is further used for taking, after the electrode sheet division module 1306 marks the electrode sheet division position, the image at the second electrode sheet edge as the first frame of image for splicing the next to-be-detected image, and re-splicing multiple images of the sequence of images according to the collection sequence to obtain a to-be-detected image with at least one electrode sheet structure.

Optionally, in one embodiment, the image collection module 1302 is further used for collecting a second sequence of images of the continuous composite strip during transportation to the stacking process. The second sequence of images is collected for the second side of the continuous composite strip, and the first side and the second side are the opposite sides of the continuous composite strip.

Optionally, in one embodiment, the to-be-detected image determination module 1304 is further used to the second sequence of images, to splice multiple images of the second sequence of images according to the collection sequence, to obtain a to-be-detected image with at least one electrode sheet structure; mark, in case where two electrode sheet edges are identified in the to-be-detected image, the position of the collection-sequentially second electrode sheet edge in the continuous composite strip as the electrode sheet division position of the continuous composite strip to obtain the electrode sheet division position on the second side of the continuous composite strip.

The electrode sheet division module 1306 is further used for determining, in case where the electrode sheet division position on the first side of the continuous composite strip is same as the electrode sheet division position on the second side, the electrode sheet division position of the continuous composite strip.

In one embodiment, a marking apparatus of a continuous composite strip is provided, which, in addition to the image collection module 1302, the to-be-detected image determination module 1304 and the electrode sheet division module 1306, further includes: an abnormality detection module, an edge spacing determination module, an image of electrode sheet output module, an image feature module, a cell division detection module, and a division position marking module, in which:

The abnormality detection module is used for outputting the to-be-detected image and performing the abnormality detection of the continuous composite strip in case where no electrode sheet edge is identified in the to-be-detected image.

The edge spacing determination module is used for determining the edge spacing between the collection-sequentially first electrode sheet edge and second electrode sheet edge according to the electrode sheet division position.

The image of electrode sheet output module is used for extracting the image between the first electrode sheet edge and the second electrode sheet edge and outputting the image of electrode sheet unit in case where the edge spacing meets the spacing requirement of the electrode sheet division of the continuous composite strip.

The edge spacing determination module is further used for obtaining respectively the position coordinates of the first electrode sheet edge and the second electrode sheet edge in the to-be-detected image; and determining the edge spacing between the first electrode sheet edge and the second electrode sheet edge according to the position coordinates.

The image feature module is used for extracting the image features of the image of electrode sheet unit.

The cell division detection module is used for detecting whether the image of electrode sheet unit meets the cell division conditions according to the image features, and determining, in case where the cell division conditions are met, whether the summed length of the multiple successive electrode sheet units in the continuous composite strip meets the requirement on the length of the cell; in this case, one cell includes a preset number of electrode sheet units.

The division position marking module is used for marking the cell division position in case where the requirement on the length of the cell is met.

The cell division detection module is further used for detecting whether the difference of the numbers of the anode tabs and the cathode tabs of the image features meets the requirement on the difference of the numbers of the cell division conditions, and detecting, in case where the requirement on the difference of the numbers of the cell division conditions is met, whether the end mark of the cell of the image features meets the requirement on the end mark of the cell division conditions, and determining, in case where the requirement on the end mark of the cell division conditions is met, that the cell division conditions are met.

The division position marking module is further used for marking the position of the end mark of the cell of the image features in the continuous composite strip as the cell division position.

The cell division detection module is further used for obtaining the number of the pulses for image collection of the continuous composite strip during the transportation to the stacking process; and detecting whether the number of the pulses for image collection meets the requirement on the pulses of the cell division.

Each module of the above marking apparatus of the continuous composite strip may be realized in whole or in part by software, hardware and their combination. The above modules may be embedded in or independent of the processor of the computer device in the hardware form, and may also be stored in the memory of the computer device in the software form, so as to facilitate the processor to call and execute the corresponding operations of the above modules.

In one embodiment, a computer device is also provided, which includes a memory storing a computer program, and a processor which implements the steps of each of the above method embodiments when executing the computer program.

Figure 14:
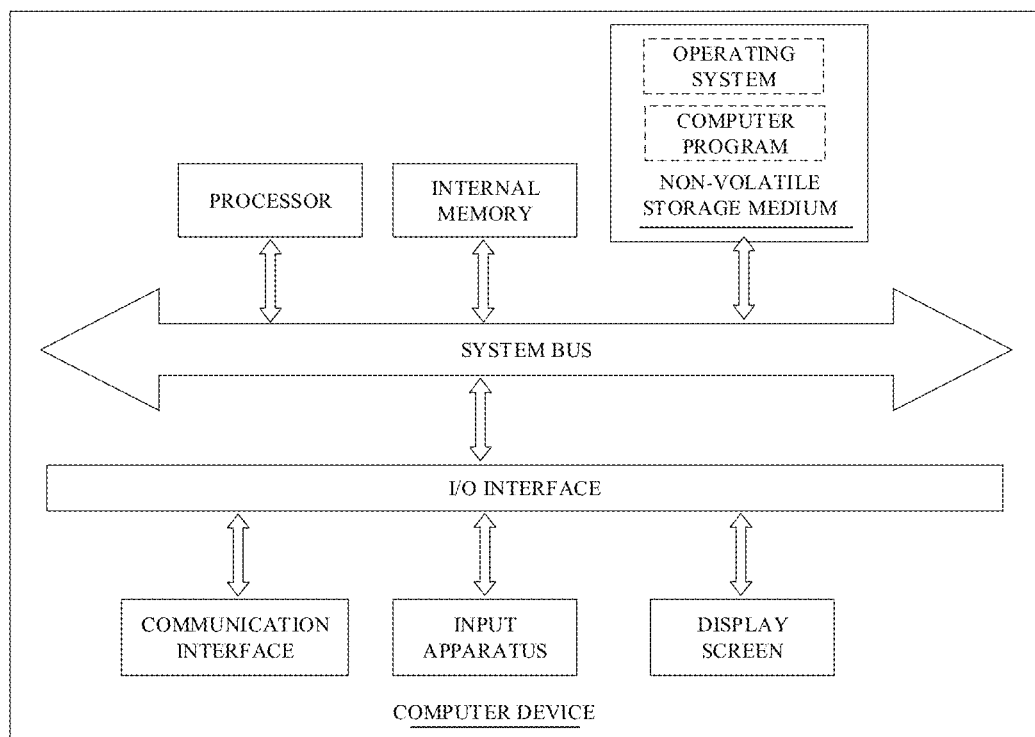
FIG. 14 is an internal structural diagram of a computer device in one embodiment.

In one embodiment, a computer device is provided, which may be a terminal, whose internal structure diagram may be as shown in FIG. 14. The computer device includes a processor, a memory, a communication interface, a display screen and an input apparatus connected by a system bus. In this case, the processor of the computer device is used to provide computing and controlling. The memory of the computer device includes a non-volatile storage medium and an internal memory. The non-volatile storage medium stores the operating system and the computer program. The internal memory provides an environment for the operation of the operating system and the computer programs in the non-volatile storage medium. The communication interface of the computer device is used for communication with an external terminal by wired or wireless means, and the wireless means may be effected through WIFI, mobile cellular networks, NFC (Near Field communication) or other technologies. The computer program implements a marking method of a continuous composite strip when executed by the processor. The display screen of the computer device may be a liquid crystal display screen or an electronic ink display screen, and the input apparatus of the computer device may be a touch layer covered on the display screen, or a button, trackball or trackpad arranged on the shell of the computer device, or an external keyboard, trackpad or mouse, etc. It may be understood by those skilled in the art that the structure shown in FIG. 14 is only a block diagram of a part of the structure related to the solution of this disclosure and does not constitute a limitation of the computer device to which the solution of this disclosure is applied. The specific computer device may include more or less components than shown in the figure, or have some components combined, or have different component arrangements.

Based on the same inventive concept, the embodiments of this disclosure also provide a marking system of a continuous composite strip for realizing the above mentioned marking method of the continuous composite strip. The implementations provided by the system to solve the problem are similar to the implementations recited in the above method, so for the specific limitations of the embodiments of the marking system of one or more continuous composite strips provided below, one may refer to the limitations of the above marking method of the continuous composite strip, which will not be repeated here.

Figure 15:
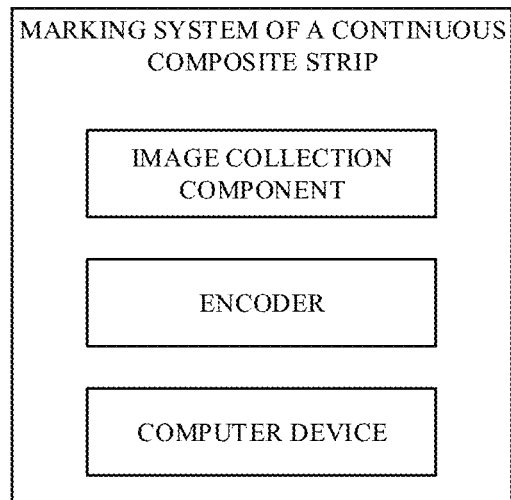
FIG. 15 is a structural block diagram of a marking system of a continuous composite strip in one embodiment.

In one embodiment, as shown in FIG. 15, a marking system of a continuous composite strip is provided. The system includes an image collection component, an encoder, a memory and the computer device as described above. The image collection component supports the continuous composite strip, and the continuous composite strip drives the encoder to operate during the travel of the strip to trigger the image collection component to collect images.

In this case, the image collection component includes a photographing roller and a linear array camera. The photographing roller supports the continuous composite strip, and a group of linear array cameras are arranged at the corresponding position of the photographing roller. The continuous composite strip drives the encoder to operate during the travel of the strip to trigger the linear array cameras to collect images. Optionally, a group of linear array cameras and a linear light source may be arranged respectively at the corresponding positions of the photographing roller to collect images of the front and back sides of the strip, so as to improve the quality of the image collection.

Figure 16:
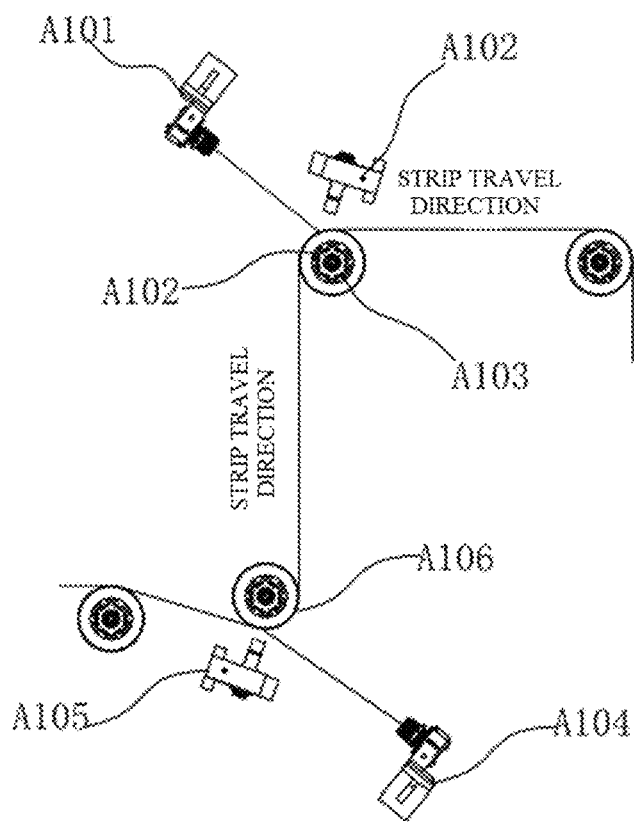
FIG. 16 is a schematic diagram showing a corresponding hardware layout of a marking system of a continuous composite strip in one embodiment.

In one embodiment, as shown in FIG. 16, which is a schematic diagram showing a corresponding hardware layout of the marking system of the continuous composite strip, two photographing rollers are respectively arranged in the process of the travel of the strip, and the two photographing rollers support the front and back sides of the strip respectively. A group of linear array cameras and a linear light source are respectively arranged at the corresponding positions of the two photographing rollers to collect images of the front and back sides of the strip respectively. During the travel of the strip, the encoder is driven to operate to trigger the line-scan cameras to collect images. In this case, A101 indicates the linear array camera for detection of the front side of the strip, A102 indicates the front-side-detection light source, A103 indicates the photographing/encoding roll for detection of the front side of the strip, A104 indicates the linear array camera for detection of the back side of the strip, A105 indicates the back-side-detection light source, A103 indicates the photographing/encoding roll for detection of the back side of the strip.

In one embodiment, a computer-readable storage medium is provided, on which a computer program is stored. The computer program implements the steps of each of the above method embodiments when executed by a processor.

In one embodiment, a computer program product is provided, including a computer program which, when executed by a processor, implements the steps of each of the above method embodiments.

Those skill in the art may understand that the whole or part of the process of the above method embodiments may be realized by a computer program instructing relevant hardware. The computer program may be stored in a non-volatile computer-readable storage medium, and implement, when executed, the process of each of the above method embodiments. In this case, any reference to the memory, database or other medium used in each of the embodiments provided herein may include at least one of the nonvolatile and the volatile memory. The non-volatile memory may include a Read Only Memory (ROM), a magnetic tape, a floppy disk, a flash memory, an optical memory, a high-density embedded non-volatile memory, a resistive memory (ReRAM), a Magnetoresistive Random Access Memory (MRAM), a Ferroelectric Random Access Memory (FRAM), a Phase Change Memory (PCM), a graphene memory, etc. The volatile memory may include a Random Access Memory (RAM) or an external cache memory, etc. As an illustration rather than a limitation, the RAM may come in many forms, such as a Static Random Access Memory (SRAM) or a Dynamic Random Access Memory (DRAM), etc. The databases involved in the embodiments provided in this disclosure may include at least one of the relational and the non-relational databases. The non-relational databases may include, but are not limited to, a blockchain-based distributed databases. The processor involved in the embodiments provided in this disclosure may be, but are not limited to, a general-purpose processor, a central processing processor, a graphics processor, a digital signal processor, programmable logics, data processing logics based on quantum computing, etc.

The technical features of the above embodiments may be combined at will. In order to make the description concise, not all possible combinations of the technical features in the above embodiments are described. However, as long as there is no contradiction in the combination of these technical features, it shall be considered to be the scope recorded in this specification.

The above embodiments only express several implementations of this disclosure, whose description are relatively specific and detailed, but cannot be understood as limitations of the scope of the patent disclosure. It should be pointed out that for those skilled in the field, without deviating from the premise of the concept of this disclosure, there are several variations and improvements that can be made, which are within the scope of protection of this disclosure. Therefore, the scope of protection of this disclosure shall be those specified by the attached claims.

What is claimed is:

1. A method of marking a continuous composite strip, the method comprising:
   collecting a first sequence of images of the continuous composite strip;
   splicing multiple images of the first sequence of images according to a collection sequence, to obtain a to-be-detected image with at least one electrode sheet structure;
   marking, in case where a first electrode sheet edge and a second electrode sheet edge along the collection sequence are identified in the to-be-detected image, a position of the second electrode sheet edge in the continuous composite strip as an electrode sheet division position of the continuous composite strip;
   determining an edge spacing between the first electrode sheet edge and the second electrode sheet edge according to collection sequence and the electrode sheet division position; and
   outputting an image of an electrode sheet unit comprising one of the at least one electrode sheet structure, in case where the edge spacing meets a spacing requirement of electrode sheet division of the continuous composite strip.

2. The method according to claim 1, wherein the method further comprises:
   splicing, in case where only one electrode sheet edge is identified in the to-be-detected image, the to-be-detected image with a next frame of image adjacent to the to-be-detected image in the first sequence of images, and updating the to-be-detected image.

3. The method according to claim 1, wherein the method further comprises:
   taking an image at the second electrode sheet edge as a first frame of image for splicing a next to-be-detected image, and returning to step of splicing multiple images of the first sequence of images according to the collection sequence to obtain the to-be-detected image with at least one electrode sheet structure.

4. The method according to claim 1, wherein the first sequence of images is collected for a first side of the continuous composite strip, and the method further comprises:
   collecting a second sequence of images of the continuous composite strip during transportation to a stacking process; the second sequence of images is collected for a second side of the continuous composite strip, and the first side and the second side are opposite sides of the continuous composite strip;
   splicing, for the second sequence of images, multiple images of the second sequence of images according to the collection sequence, to obtain a second to-be-detected image with at least one electrode sheet structure;

marking, in case where a first electrode sheet edge and a second electrode sheet edge along the collection sequence are identified in the second to-be-detected image, a position of the second electrode sheet edge of the second to-be-detected image in the continuous composite strip as an electrode sheet division position on the second side of the continuous composite strip; and determining, in case where the electrode sheet division position on the first side of the continuous composite strip is same as the electrode sheet division position on the second side, the electrode sheet division position of the continuous composite strip.

5. The method according to claim 1, wherein the method further comprises:
outputting the to-be-detected image and performing an abnormality detection of the continuous composite strip in case where no electrode sheet edge is identified in the to-be-detected image.

6. The method according to claim 1, wherein the method further comprises:
extracting an image between the first electrode sheet edge and the second electrode sheet edge.

7. The method according to claim 6, wherein after extracting the image between the first electrode sheet edge and the second electrode sheet edge and outputting the image of the electrode sheet unit in case where the edge spacing meets a spacing requirement of electrode sheet division of the continuous composite strip, the method further comprises:
extracting image features of the image of electrode sheet unit;
detecting whether the image of the electrode sheet unit meets cell division conditions according to the image features;
determining, in case where the cell division conditions are met, whether a summed length of multiple successive electrode sheet units in the continuous composite strip meets a requirement on length of a cell; wherein, one cell comprises a preset number of electrode sheet units; and
marking a cell division position in case where the requirement on the length of the cell is met.

8. The method according to claim 7, wherein detecting whether the image of the electrode sheet unit meets the cell division conditions according to the image features comprises:
detecting whether a difference of numbers of anode tabs and cathode tabs of the image features meets a requirement on difference of numbers of cell division conditions,
detecting, in case where the requirement on the difference of the numbers of the cell division conditions is met, whether an end mark of the cell of the image features meets a requirement on end mark of the cell division conditions, and
determining, in case where the requirement on the end mark of the cell division conditions is met, that the cell division conditions are met.

9. The method according to claim 8, wherein marking the cell division position comprises:
marking a position of the end mark of the cell of the image features in the continuous composite strip as the cell division position.

10. The method according to claim 8, wherein prior to marking the cell division position, the method further comprises:

obtaining number of pulses for image collection of the continuous composite strip during transportation to stacking process; and
detecting whether the number of the pulses for image collection meets a requirement on pulses of cell division.

11. The method according to claim 1, wherein determining the edge spacing between the first electrode sheet edge and the second electrode sheet edge comprises:
obtaining respectively position coordinates of the first electrode sheet edge and the second electrode sheet edge in the to-be-detected image; and
determining the edge spacing between the first electrode sheet edge and the second electrode sheet edge according to the position coordinates.

12. A computer device comprising:
a computer-readable storage medium storing a computer program; and
a processor,
wherein the computer program when executed by the processor causes the computer device to:
collect a first sequence of images of a continuous composite strip;
splice multiple images of the first sequence of images according to a collection sequence, to obtain a to-be-detected image with at least one electrode sheet structure; and
mark, in case where a first electrode sheet edge and a second electrode sheet edge along the collection sequence are identified in the to-be-detected image, a position of the second electrode sheet edge in the continuous composite strip as an electrode sheet division position of the continuous composite strip;
determine an edge spacing between the first electrode sheet edge and the second electrode sheet edge according to collection sequence and the electrode sheet division position; and
output an image of an electrode sheet unit comprising one of the at least one electrode sheet structure, in case where the edge spacing meets a spacing requirement of electrode sheet division of the continuous composite strip.

13. A marking system of a continuous composite strip comprising an image collection component, an encoder, a memory, and the computer device according to claim 12, wherein the image collection component supports the continuous composite strip, and the continuous composite strip drives the encoder to operate during travel of the strip to trigger the image collection component to collect images.

14. The computer device according to claim 12, wherein the computer program when executed by the processor further causes the computer device to:
splice, in case where only one electrode sheet edge is identified in the to-be-detected image, the to-be-detected image with a next frame of image adjacent to the to-be-detected image in the first sequence of images; and
update the to-be-detected image.

15. The computer device according to claim 12, wherein the computer program when executed by the processor further causes the computer device to:
take an image at the second electrode sheet edge as a first frame of image for splicing a next to-be-detected image; and
return to step of splicing multiple images of the first sequence of images according to the collection sequence to obtain the to-be-detected image with at least one electrode sheet structure.

16. The computer device according to claim 12, wherein the first sequence of images is collected for a first side of the continuous composite strip, and the computer program when executed by the processor further causes the computer device to:
- collect a second sequence of images of the continuous composite strip during transportation to a stacking process, wherein the second sequence of images is collected for a second side of the continuous composite strip, and the first side and the second side are opposite sides of the continuous composite strip;
- splice, for the second sequence of images, multiple images of the second sequence of images according to the collection sequence, to obtain a second to-be-detected image with at least one electrode sheet structure;
- mark, in case where a first electrode sheet edge and a second electrode sheet edge along the collection sequence are identified in the second to-be-detected image, a position of the second electrode sheet edge of the second to-be-detected image in the continuous composite strip as an electrode sheet division position on the second side of the continuous composite strip; and
- determine, in case where the electrode sheet division position on the first side of the continuous composite strip is same as the electrode sheet division position on the second side, the electrode sheet division position of the continuous composite strip.

17. The computer device according to claim 12, wherein the computer program when executed by the processor further causes the computer device to:
- output the to-be-detected image and performing an abnormality detection of the continuous composite strip in case where no electrode sheet edge is identified in the to-be-detected image.

18. The computer device according to claim 12, wherein the computer program when executed by the processor further causes the computer device to:
- obtain respectively position coordinates of the first electrode sheet edge and the second electrode sheet edge in the to-be-detected image; and
- determine the edge spacing between the first electrode sheet edge and the second electrode sheet edge according to the position coordinates.

19. The computer device according to claim 12, wherein the computer program when executed by the processor further causes the computer device to:
- extract image features of the image of electrode sheet unit, after extracting the image between the first electrode sheet edge and the second electrode sheet edge and outputting the image of the electrode sheet unit in case where the edge spacing meets the spacing requirement of the electrode sheet division of the continuous composite strip;
- detect whether the image of the electrode sheet unit meets cell division conditions according to the image features;
- determine, in case where the cell division conditions are met, whether a summed length of multiple successive electrode sheet units in the continuous composite strip meets a requirement on length of a cell; wherein, one cell comprises a preset number of electrode sheet units; and
- mark a cell division position in case where the requirement on the length of the cell is met.

20. A non-transitory computer-readable storage medium on which a computer program is stored, wherein the computer program when executed by a processor causes the processor to:
- collect a first sequence of images of a continuous composite strip;
- splice multiple images of the first sequence of images according to a collection sequence, to obtain a to-be-detected image with at least one electrode sheet structure; and
- mark, in case where a first electrode sheet edge and a second electrode sheet edge along the collection sequence are identified in the to-be-detected image, a position of the second electrode sheet edge in the continuous composite strip as an electrode sheet division position of the continuous composite strip;
- determine an edge spacing between the first electrode sheet edge and the second electrode sheet edge according to collection sequence and the electrode sheet division position; and
- output an image of an electrode sheet unit comprising one of the at least one electrode sheet structure, in case where the edge spacing meets a spacing requirement of electrode sheet division of the continuous composite strip.

* * * * *